United States Patent
Shimonaka

(10) Patent No.: US 8,125,534 B2
(45) Date of Patent: Feb. 28, 2012

(54) IMAGE PROCESSING APPARATUS

(75) Inventor: Shuji Shimonaka, Osaka (JP)

(73) Assignee: Keyence Corporation, Osaka (JP)

( * ) Notice: Subject to any disclaimer, the term of this patent is extended or adjusted under 35 U.S.C. 154(b) by 577 days.

(21) Appl. No.: 12/338,134

(22) Filed: Dec. 18, 2008

(65) Prior Publication Data

US 2009/0189994 A1   Jul. 30, 2009

(30) Foreign Application Priority Data

Jan. 24, 2008   (JP) ................. 2008-014262

(51) Int. Cl.
*H04N 5/228* (2006.01)
*H04N 5/76* (2006.01)

(52) U.S. Cl. ............ 348/222.1; 348/231.99; 348/79; 348/80

(58) Field of Classification Search ........... 348/222.1, 348/79, 80
See application file for complete search history.

(56) References Cited

U.S. PATENT DOCUMENTS

| | | | |
|---|---|---|---|
| 7,199,823 B2 * | 4/2007 | Masuyama | 348/229.1 |
| 2007/0248331 A1 * | 10/2007 | Hamada et al. | 386/112 |
| 2008/0291597 A1 * | 11/2008 | Seibel et al. | 361/241 |

FOREIGN PATENT DOCUMENTS

JP   2006-030969   2/2006

* cited by examiner

*Primary Examiner* — Sinh Tran
*Assistant Examiner* — Shahbaz Nazrul
(74) *Attorney, Agent, or Firm* — Kilyk & Bowersox, P.L.L.C.

(57) ABSTRACT

It is an object to provide an image pickup apparatus capable of changing over the operation mode between a magnification observation mode and a high-speed photographing mode without increasing the fabrication cost. An image processing apparatus includes a mode selection part which selects one of a magnification observation mode and a high-speed photographing mode, a frame-rate conversion part which performs processing for decreasing the frame rate of images created by image pickup, a volatile memory into which image data having a high frame rate from an image pickup part are written during recording operations in the high-speed photographing mode, a moving-image readout part which reads out image data from the volatile memory in reading out image data in the high-speed photographing mode, an image processing part which performs processing for adjusting luminance levels on image data subjected to the frame-rate conversion to create display data and, also, performs processing for adjusting luminance levels on image data read out from the volatile memory by the moving-image readout part, and a changeover part which connects the frame-rate conversion part or the moving-image readout part to the image processing part.

6 Claims, 33 Drawing Sheets

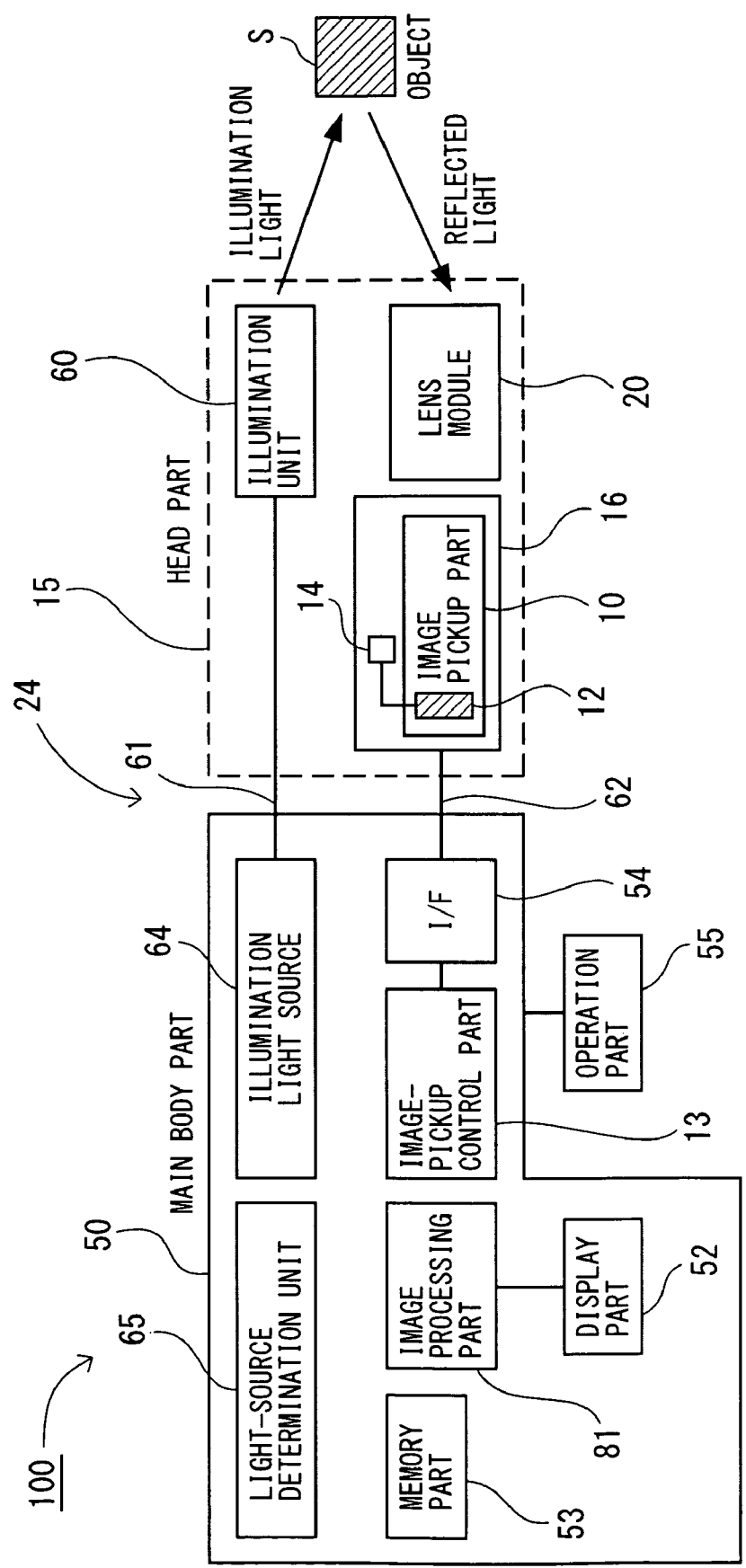

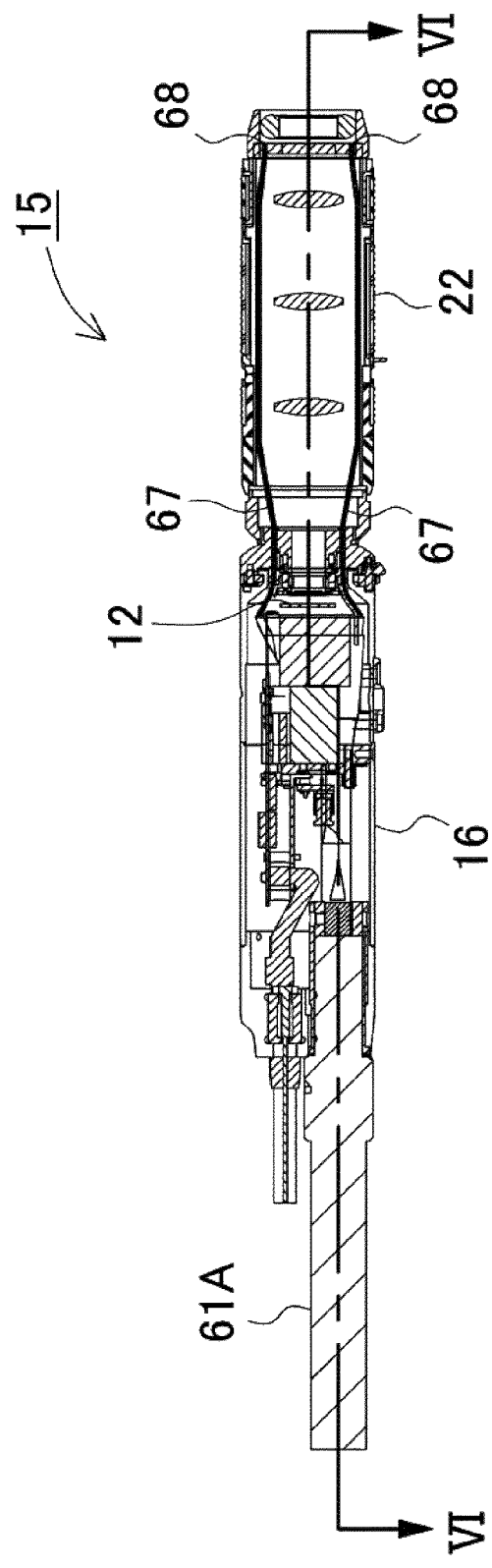
F I G. 5

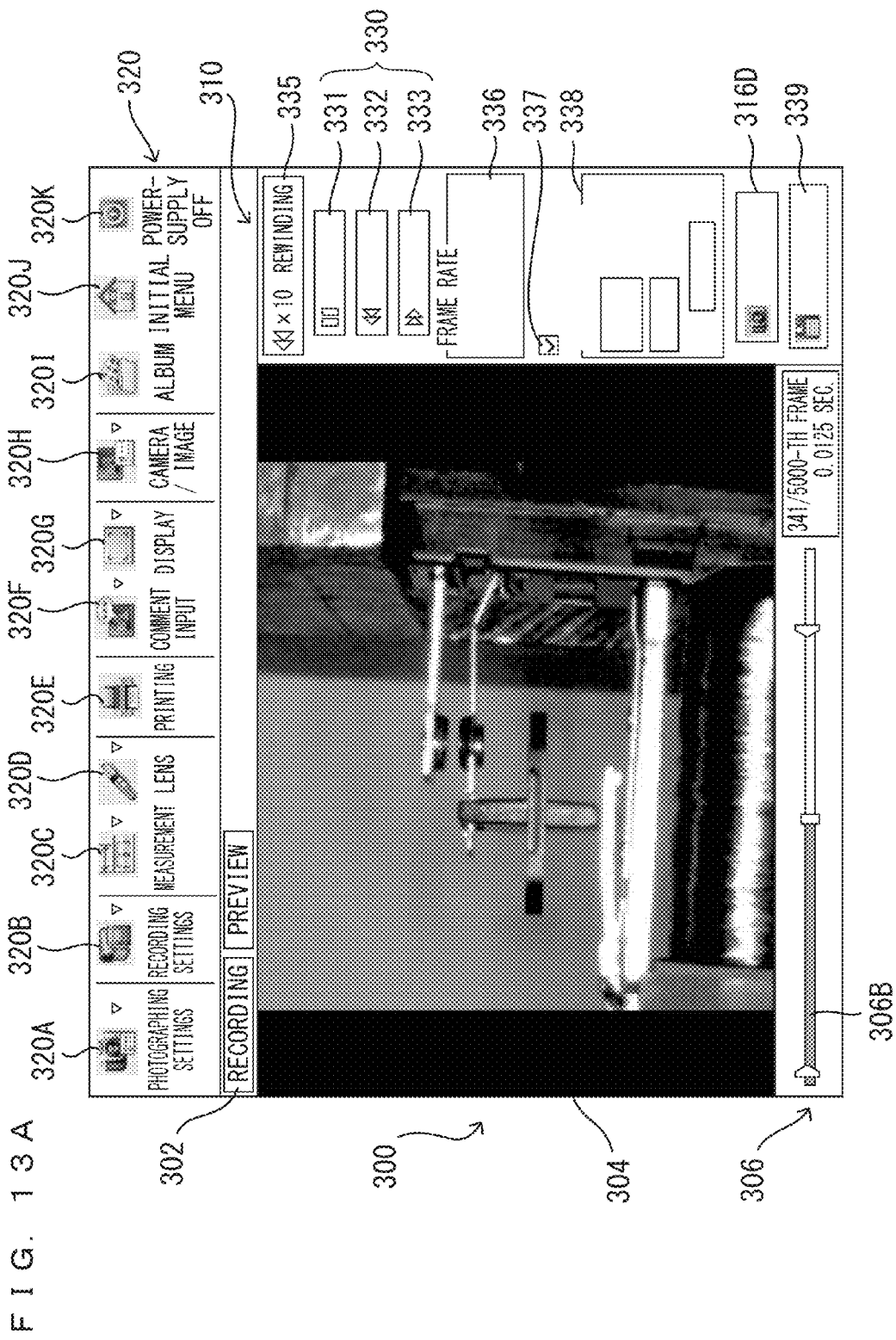

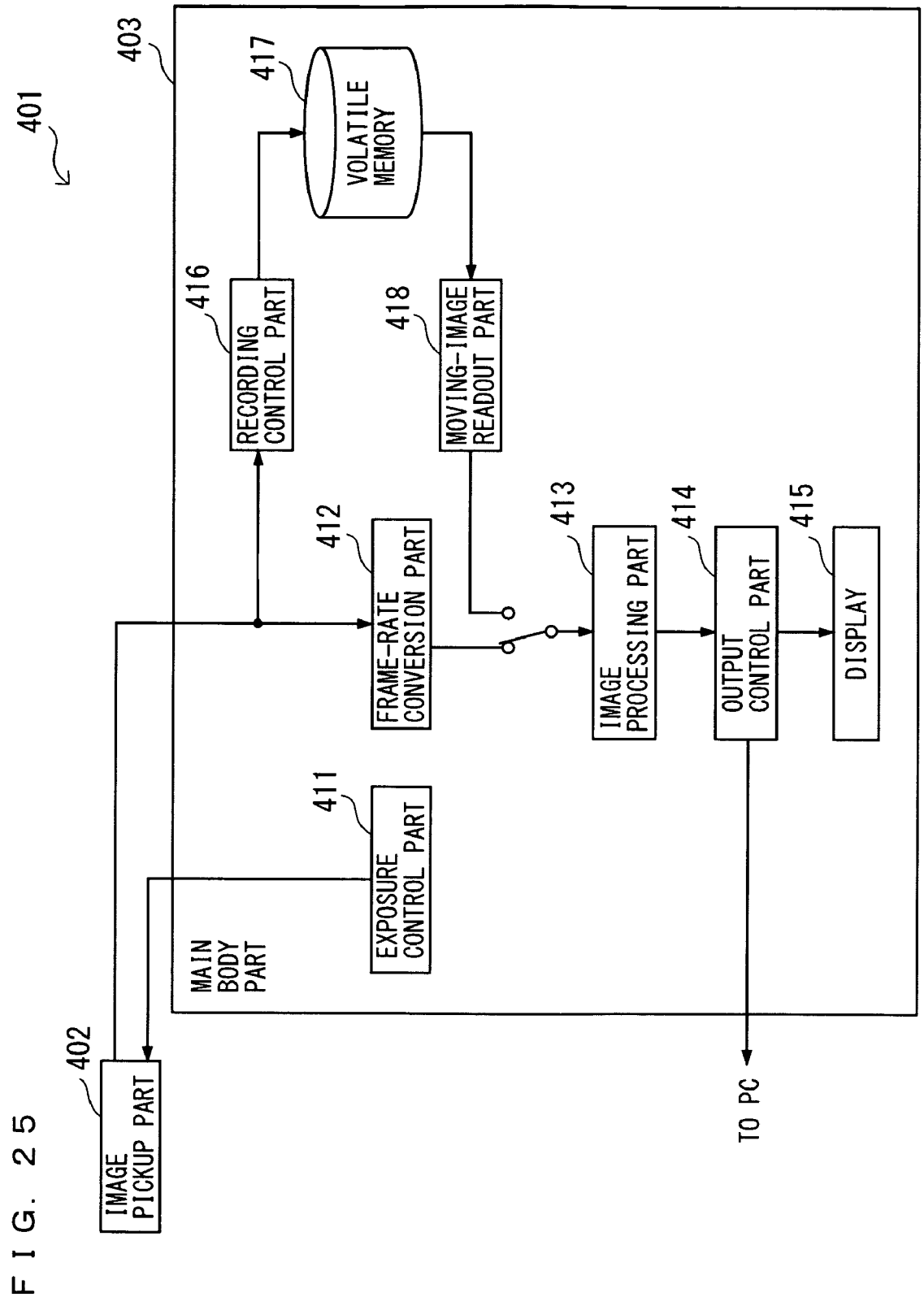
F I G. 25

IMAGE PROCESSING APPARATUS

CROSS-REFERENCE TO RELATED APPLICATIONS

The present application claims foreign priority based on Japanese Patent Application No. 2008-014262, filed Jan. 24, 2008, the contents of which is incorporated herein by reference.

BACKGROUND OF THE INVENTION

1. Field of the Invention

The present invention relates to an image processing apparatus and, more particularly, relates to improvements of an image processing apparatus capable of changing over the operation mode between a magnification observation mode for observing an object by magnifying it and a high-speed photographing mode for photographing movement of an object at a high speed.

2. Description of the Related Art

As apparatuses for observing to-be-inspected objects by magnifying them, there have been conventionally known magnification observation apparatuses (for example, JP-A No. 2006-030969). A magnification observation apparatus irradiates a to-be-inspected object as an object with light and receives reflected light or transmitted light from the object through an optical lens to create a magnified image of the object. Such a magnification observation apparatus is generally constituted by a head part including an image pickup element constituted by plural light receiving elements for receiving light from the object, and a main body part which performs processing on image signals from the head part and displays images in its screen.

FIG. 24 is a block diagram illustrating a conventional magnification observation apparatus. The magnification observation apparatus 201 includes a head part 202 which is constituted by an image pickup part 211 and an illumination part 212 and, further, includes a main body part 203 constituted by a light-source device 213, an exposure control part 214, an image processing part 215, an output control part 216, a display 217 and a nonvolatile memory 218. The illumination part 212 is an illumination device for illuminating an object and irradiates the object with light transferred through a light transmission cable from the light-source device 213 in the main body part 203. The exposure control part 214 performs an operation for specifying light exposure timings and the like to the image pickup part 211. The image processing part 215 performs processing such as gamma correction on image data from the image pickup part 211. The output control part 216 performs operations for displaying the image data from the image processing part 215 on the display 217 and, also, if necessary, writing the image data in the nonvolatile memory 218. The magnification observation apparatus performs analysis processing such as measurements of dimensions of objects and synthesis of depths by using image data accumulated in the nonvolatile memory 218.

As a camera (the image pickup part) used in such a magnification observation apparatus, in general, an image pickup element which operates at frame rates lower than a video rate is used. For example, an image pickup element which operates at frame rates in the range of 15 fps to 60 fps is employed. On the contrary, with an apparatus for photographing movement of an object at a high speed, an image pickup element capable of operating at a higher speed than the video rate is employed. For example, an image pickup element which operates at frame rates higher than 250 fps is employed.

FIG. 25 is a block diagram illustrating a conventional high-speed photographing apparatus. The high-speed photographing apparatus 401 is constituted by an image pickup part 402 which receives light from an object and creates image signals, and a main body part 403 which processes image signals from the image pickup part 402. The main body part 403 is constituted by an exposure control part 411, a frame-rate conversion part 412, an image processing part 413, an output control part 414, a display 415, a recording control part 416, a volatile memory 417 and a moving-image readout part 418. The frame-rate conversion part 412 performs processing for decreasing the frame rate of image data transferred from the image pickup part 402, in order to monitor images created by photographing. The image processing part 413 performs processing on the image data which has been subjected to the frame-rate conversion and displays it on the display 415. The recording control part 416 performs an operation of writing, in the volatile memory 417, image data transferred from the image pickup part 402. The volatile memory 417 is a storage device capable of operating at a higher speed than that of the nonvolatile memory 218. The moving-image readout part 418 performs operations of reading image data from the volatile memory 417 and transferring it to the image processing part 413 at a frame rate lower than that upon writing by the recording control part 416, in order to slow replay of moving images.

If a single apparatus can be utilized for both the aforementioned magnification observations and high-speed photographing, it is possible to increase its convenience. It is considered to constitute an image pickup device including a main body part which is provided with an image processing part for processing image signals from an image pickup part during magnification observations, and an image processing part for processing image signals from the image pickup part during high-speed photographing. However, this requires provision of both the image processing part for magnification observations and the image processing part for high-speed photographing, and there is a problem of increase of the fabrication cost.

SUMMARY OF THE INVENTION

The present invention has been made in view of the aforementioned circumstances and aims to provide an image processing apparatus capable of changing over the operation mode between a magnification observation mode for observing an object by magnifying it and a high-speed photographing mode for photographing movement of an object at a high speed. Particularly, the present invention aims to provide an image processing apparatus capable of changing over the operation mode between a magnification observation mode and a high-speed photographing mode without increasing the fabrication cost.

An image processing apparatus according to a first invention is an image processing apparatus which performs image processing on images created by image pickup at a first image frame rate which can visually recognize the images and, also, performs image processing on images created by image pickup at a second image frame rate higher than the first frame rate, the image processing apparatus including: a mode selection unit which selects one of a magnification observation mode for observing an object at the first frame rate by magnifying it and a high-speed photographing mode for photographing an object at a high speed at the second frame rate; an image pickup unit which is capable of capturing images at the first and second frame rates and performs image pickup on an object at the first or second frame rate selected by the mode selection unit; a frame-rate conversion unit which performs processing for decreasing the frame rate of image data of an object, the image data of the object created by image pickup at the first or second frame rate corresponding to the mode selected by the mode selection unit being transferred to the frame-rate conversion unit, by the image pickup unit; a first memory into which image data at the second frame rate from the image pickup unit is written during recording operations in the high-speed photographing mode; a moving-image readout unit which reads image data from the first memory during readout of image data from the first memory in the high-speed photographing mode; an image processing unit which performs processing for adjusting luminance levels on image data subjected to the frame-rate conversion by the frame-rate conversion unit to create display data and, also, performs processing for adjusting luminance levels on image data read from the first memory by the moving-image readout unit; a changeover unit which connects one of the frame-rate conversion unit and the moving-image readout unit to the image processing unit and, also, connects the moving-image readout unit to the image processing unit only when image data is read out from the first memory by the moving-image readout unit; a display unit which displays display data created by the image processing unit; and a second memory which stores respective images when image data displayed on the display unit is stored and image data in the first memory is stored in the magnification observation mode.

With the aforementioned image processing apparatus, it is possible to perform processing for adjusting luminance levels both in the magnification observation mode and in the high-speed photographing mode to create display data and, also, it is possible to perform processing for adjusting luminance levels on image data read out from the first memory in the case of readout in the high-speed photographing mode. Namely, the image data written in the first memory is read out by the moving-image readout unit, then is transferred to the image processing unit at a frame rate lower than that for writing and then is subjected to the luminance-level adjustment processing therein. According to such a configuration, it is possible to utilize the image processing unit both for magnification observations and for readout of moving images written in the first memory in the high-speed photographing mode, which can realize an image processing apparatus capable of changing over the operation mode between the magnification observation mode and the high-speed photographing mode without increasing the fabrication cost.

An image processing apparatus according to a second invention is an image processing apparatus which performs image processing on images created by image pickup at a first image frame rate which can visually recognize the images and, also, performs image processing on images created by image pickup at a second image frame rate higher than the first frame rate, the image processing apparatus including: a mode selection unit which selects one of a magnification observation mode for observing an object at the first frame rate by magnifying it and a high-speed photographing mode for photographing an object at a high speed at the second frame rate; an image pickup unit which is capable of capturing images at the first and second frame rates and performs image pickup on an object at the first or second frame rate selected by the mode selection unit; a frame-rate conversion unit which performs processing for decreasing the frame rate of image data of an object, the image data of the object created by image pickup at the second frame rate corresponding to the high-photographing mode selected by the mode selection unit being transferred to the frame-rate conversion unit; a first memory into which image data at the second frame rate from the image pickup unit is written during recording operations in the high-speed photographing mode; a moving-image readout unit which reads out image data from the first memory during readout of image data from the first memory in the high-speed photographing mode; an image processing unit which performs processing for adjusting luminance levels on image data having the first frame rate created by image pickup in the magnification observation mode and on image data subjected to the frame-rate conversion by the frame-rate conversion unit to create display data and, also, performs processing for adjusting luminance levels on image data read out from the first memory by the moving-image readout unit; a changeover unit which connects one of the frame-rate conversion unit and the moving-image readout unit to the image processing unit and, also, connects the moving-image readout unit to the image processing unit only when image data is read out from the first memory by the moving-image readout unit; a display unit which displays display data created by the image processing unit; and a second memory which stores respective images when image data displayed on the display unit is stored and image data in the first memory is stored in the magnification observation mode.

An image processing apparatus according to a third invention further includes an image-pickup control unit which creates exposure timing signals for specifying exposure timings and supplies them to the image pickup unit, wherein the image pickup control unit makes the exposure repetition intervals in the magnification observation mode and in the high-speed photographing mode to be different from each other in order to make the frame rates during the magnification observations and during the high-speed photographing to be different from each other. According to such a configuration, it is possible to specify exposure timings to the image pickup unit in such a way as to make the exposure repetition intervals in the magnification observation mode and in the high-speed photographing mode to be different from each other, which can acquire image data from the image pickup unit at a proper frame rate depending on the mode.

An image processing apparatus according to a fourth invention further includes a photographing-device identification unit which identifies the image pickup unit, wherein the mode selection unit selects the mode on the basis of the result of the identification by the photographing-device identification unit. According to such a configuration, the mode selection is performed on the basis of the result of the identification of the image pickup unit, which can cause the operation mode to be automatically changed over depending on whether the image pickup unit is for magnification observations or high-speed photographing. Particularly, when a camera which is not capable of operating at high speeds is connected, identifying the camera can prevent the operation mode from being changed over to the high-speed photographing mode.

According to the image processing apparatus of the present invention, it is possible to utilize the image processing unit both for magnification observations and for readout of moving images written in the first memory in the high-speed photographing mode, which can realize an image processing apparatus capable of changing over the operation mode between a magnification observation mode and a high-speed photographing mode without increasing the fabrication cost.

BRIEF DESCRIPTION OF THE DRAWINGS

FIG. 1 is a system diagram illustrating an exemplary schematic configuration of an image pickup system 100 including an image processing apparatus according to an embodiment of the present invention;

FIG. 5 is a vertical cross-sectional view illustrating a head part 15 including a second lens module 21;

FIG. 13A is a view illustrating a preview screen page for replaying recorded high-speed image-pickup data;

FIG. 25 is a block diagram illustrating a conventional high-speed photographing apparatus.

DETAILED DESCRIPTION OF THE PREFERRED EMBODIMENTS

First Embodiment

Figure 2A:
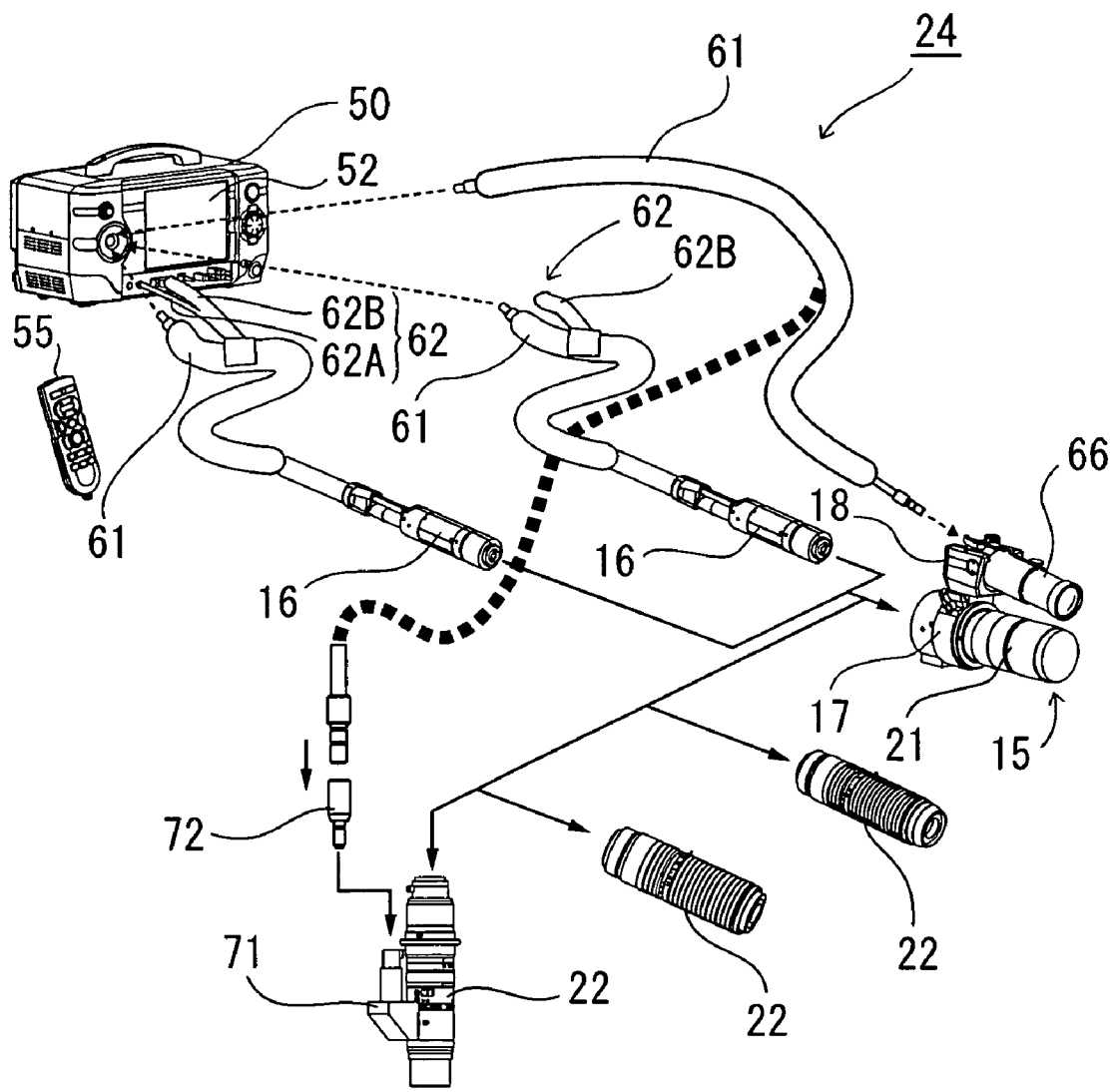
FIG. 2A is a view illustrating an exemplary configuration for connecting a head part 15 to a main body part 50, illustrating a case where an illumination-light cable and a signal cable are integrated into a single cable.

First, with referring to FIGS. 1 to 17, there will be described an image pickup system which is the premise of an image processing apparatus according to a first embodiment of the present invention. The image pickup system is a system including an image processing apparatus capable of changing over the operation mode between a magnification observation mode for observing an object by magnifying it and a high-speed photographing mode for photographing movement of an object at a high speed. In the present specification, high-speed photographing refers to photographing movement of a moving object which is hard to visually recognize with human eyes to create moving images constituted by continuous plural frames, for example, photographing at a frame rate (a number of images continuously acquired per a single second) in the range of 100 fps to 1000000 fps. In this case, it is possible to display the object in such a way as to magnify it, if necessary. On the other hand, magnification photographing refers to photographing an object which is moving less in comparison with the frame rate in such a way as to magnify it with an optical lens, for example, photographing an object in such a way as to magnify it at a magnification ratio in the range of 10 to 100000.

(System Diagram)

FIG. 1 illustrates a system diagram illustrating an example of the schematic configuration of the image pickup system 100 including the image processing apparatus according to the first embodiment of the present invention. The image pickup system 100 is constituted by a head part 15 constituted by an image pickup module 16 including an image pickup part 10, an illumination unit 60 and a lens module 20, a main body part 50 which drives and controls the head part 15 to perform image processing, and a cable part 24 which connects the head part 15 and the main body part 50 to each other.

The main body part 50 is an image processing apparatus which processes image signals from the image pickup part 10 and includes an illumination light source 64 which supplies illumination light to the illumination unit 60, an image-pickup control part 13 which creates image-pickup control signals for controlling the image pickup part 10 and transmits them to the image pickup part 10, and an image processing part 81 which performs image processing on magnified images created through image pickup by the image pickup part 10. Further, the main body part 50 includes a display part 52 which displays images created by image pickup by the image pickup part 10, and an operation part 55 which enables a user to perform various types of setting and operations. The display part 52 is incorporated in the main body part 50. The image pickup system 100 is adapted to enable replacement of the lens module 20 and the illumination unit 60 depending on applications of observations, which enables utilization of the single apparatus for plural different applications.

FIG. 2 and FIG. 3 illustrate exemplary configurations for changing the configuration of the head part 15 depending on applications and connecting it to the main body part 50. Among these figures, FIGS. 2A to 2D illustrate an example where the cable part 24 used therein includes an illumination-light supply cable 61 and a signal transmission cable 62 which are integrated with each other, while FIGS. 3A to 3D illustrate an example where the cable part 24 used therein includes an illumination-light supply cable 61 and a signal transmission cable 62 which are configured separately from each other.

Figure 2B:
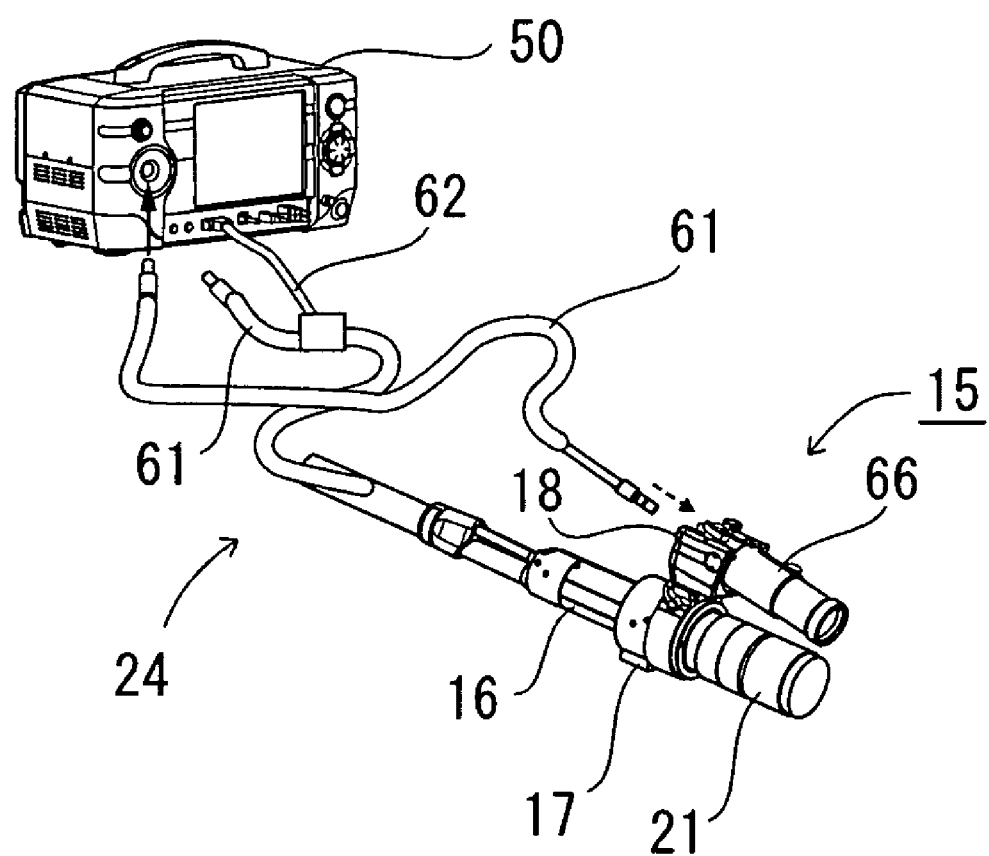
FIG. 2B is a view illustrating the image pickup system 100 including a head part 15 for high-speed photographing.
Figure 2C:
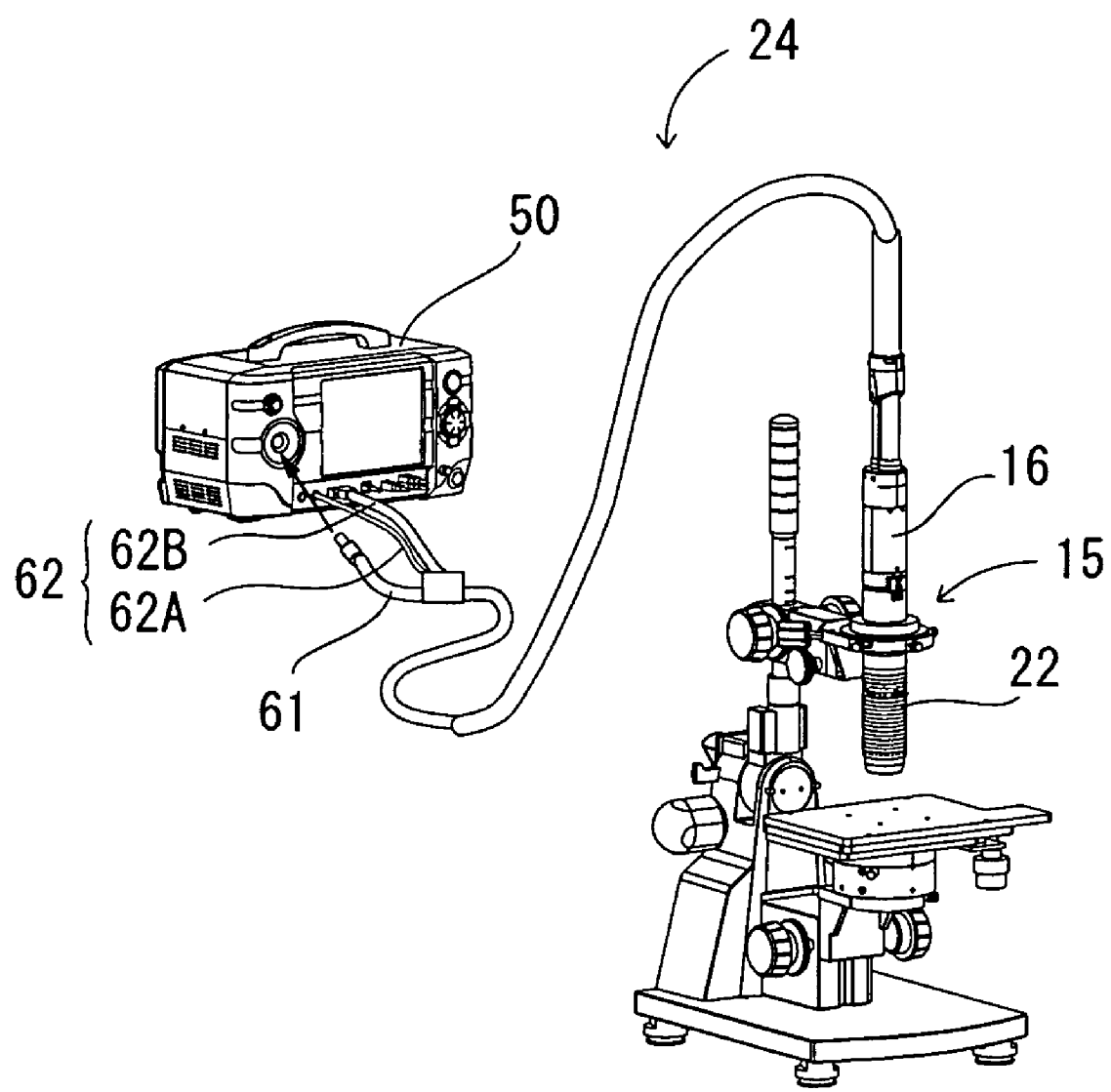
FIG. 2C is a view illustrating the image pickup system 100 including a head part 15 for magnification observations which includes a ring-shaped illumination device.
Figure 2D:
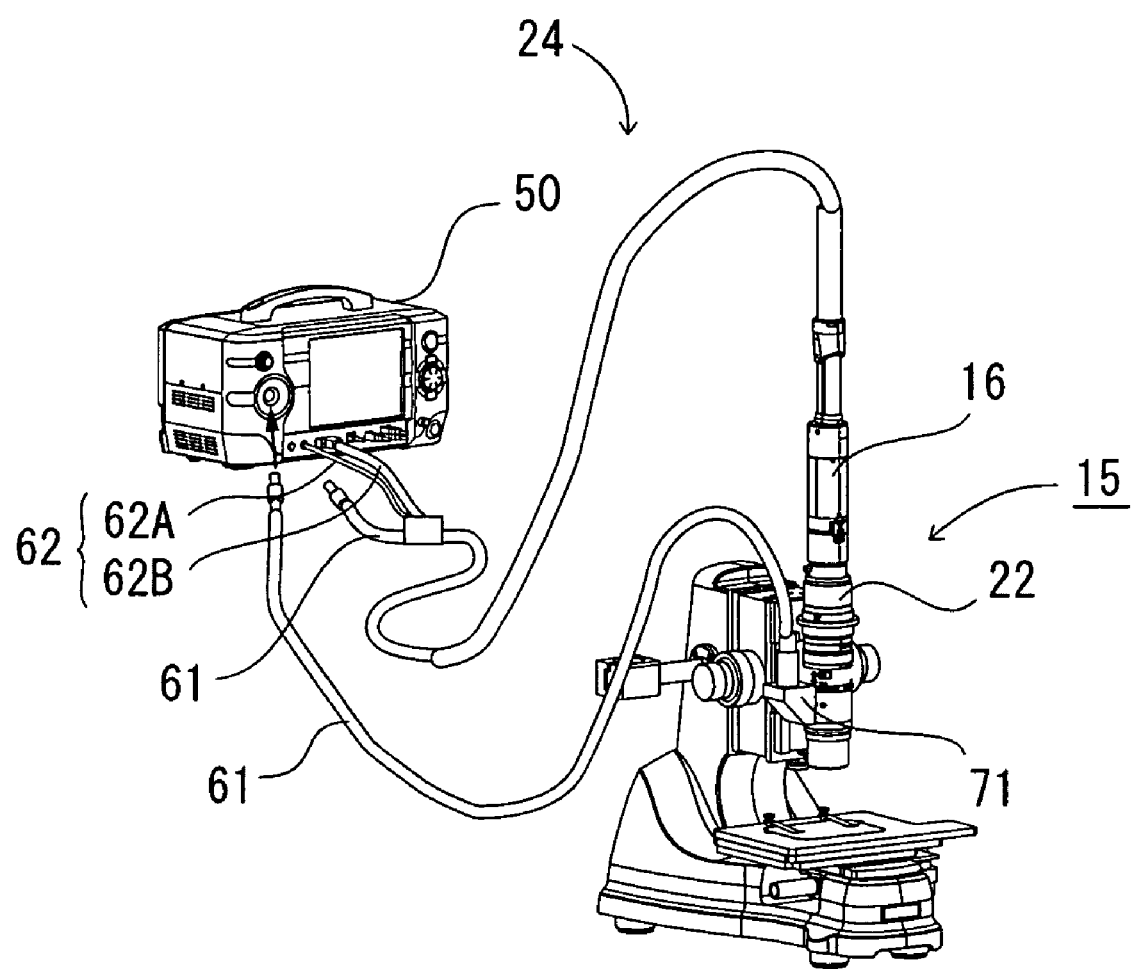
FIG. 2D is a view illustrating the image pickup system 100 including a head part 15 for magnification observations which includes a coaxial incident illumination device.
Figure 3A:
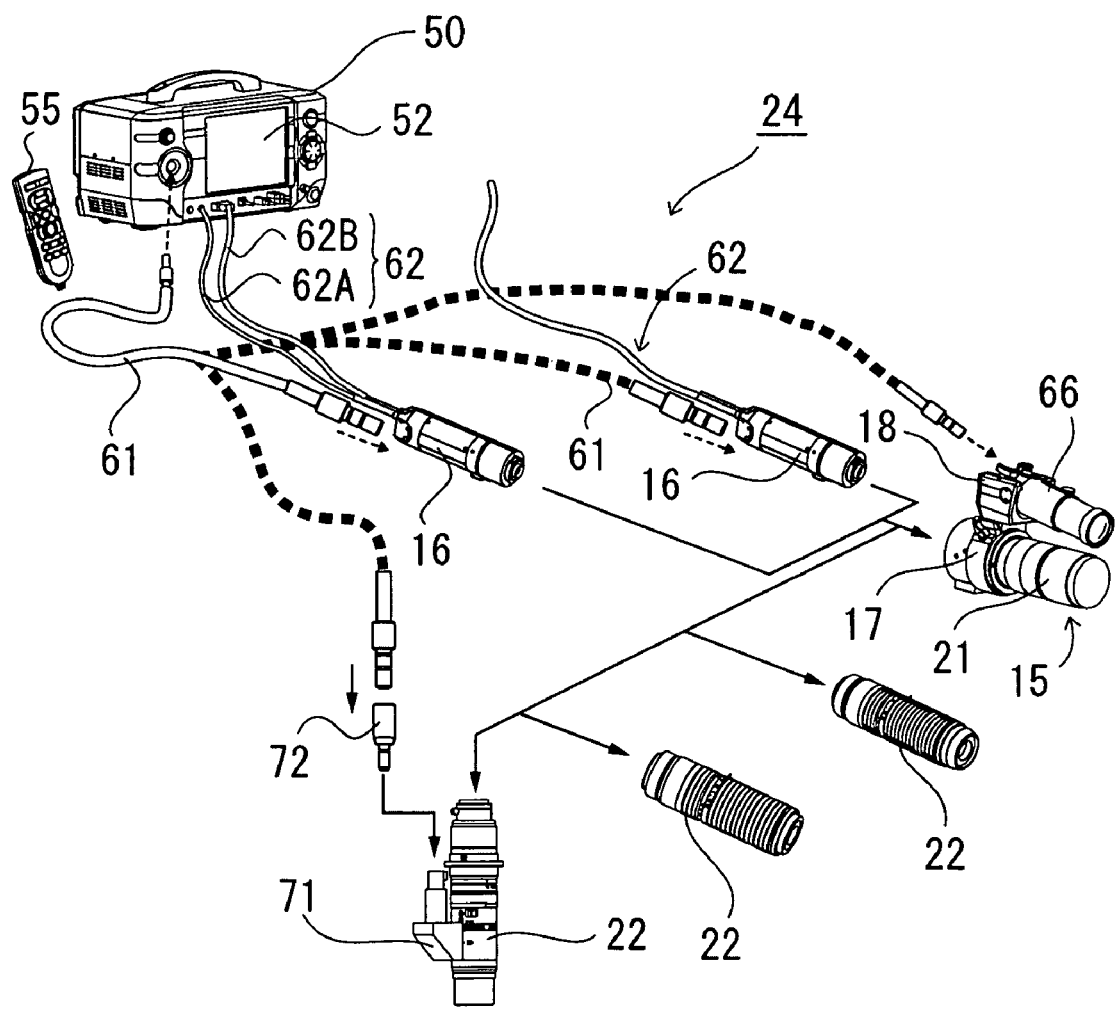
FIG. 3A is a view illustrating an exemplary configuration for connecting a head part 15 to the main body part 50, illustrating a case where an illumination-light cable and a signal cable are provided as separated cables.
Figure 3B:
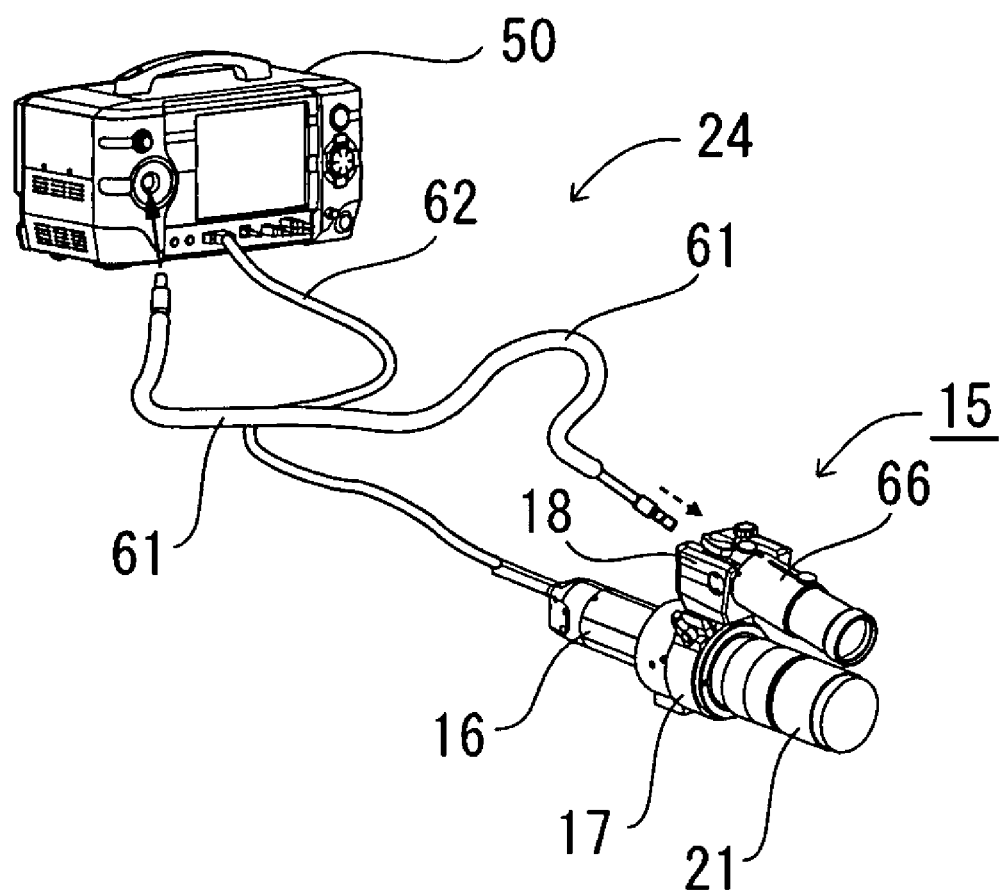
FIG. 3B is a view illustrating the image pickup system 100 including a head part 15 for high-speed photographing.
Figure 3C:
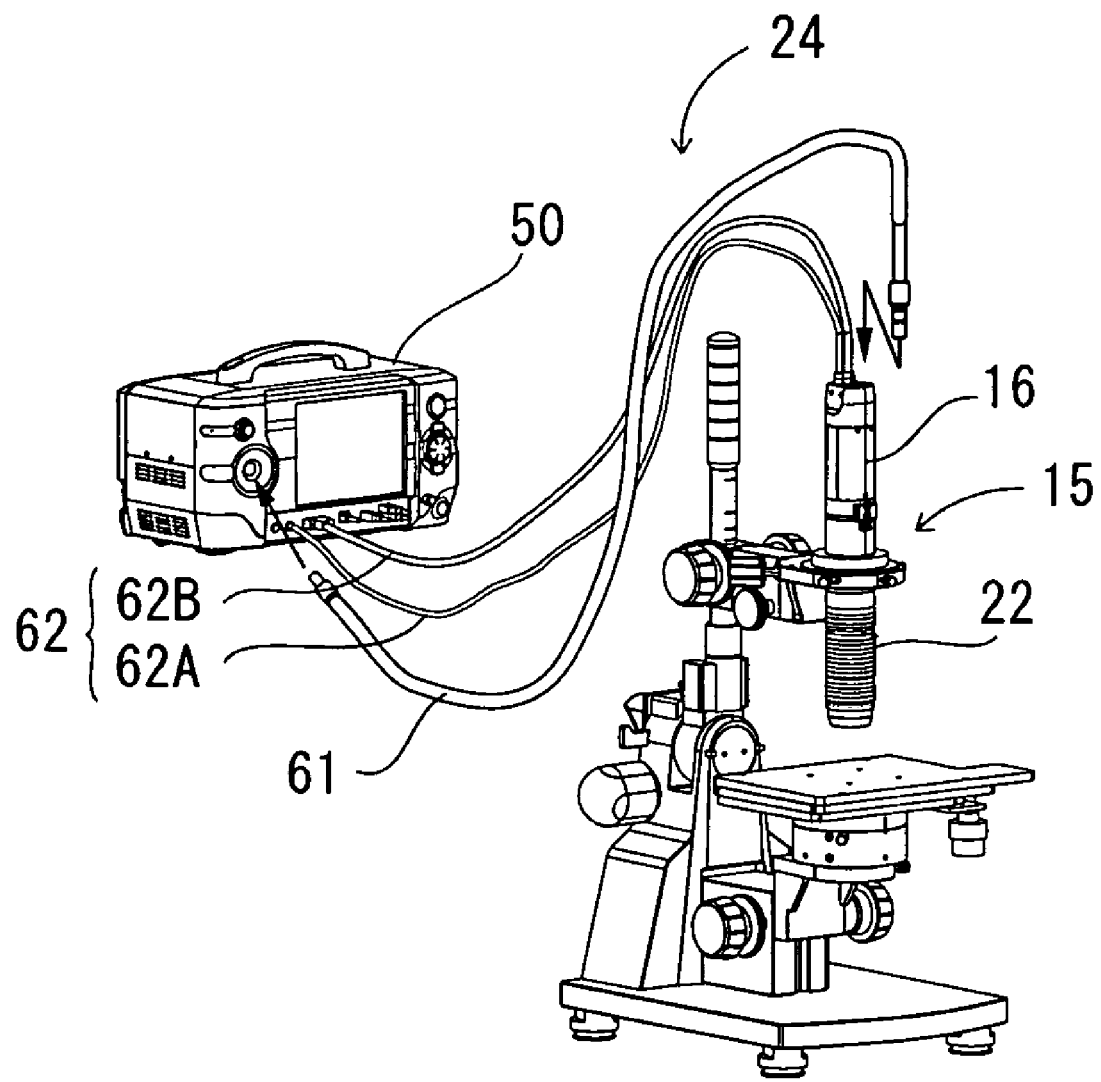
FIG. 3C is a view illustrating the image pickup system 100 including a head part 15 for magnification observations which includes a ring-shaped illumination device.
Figure 3D:
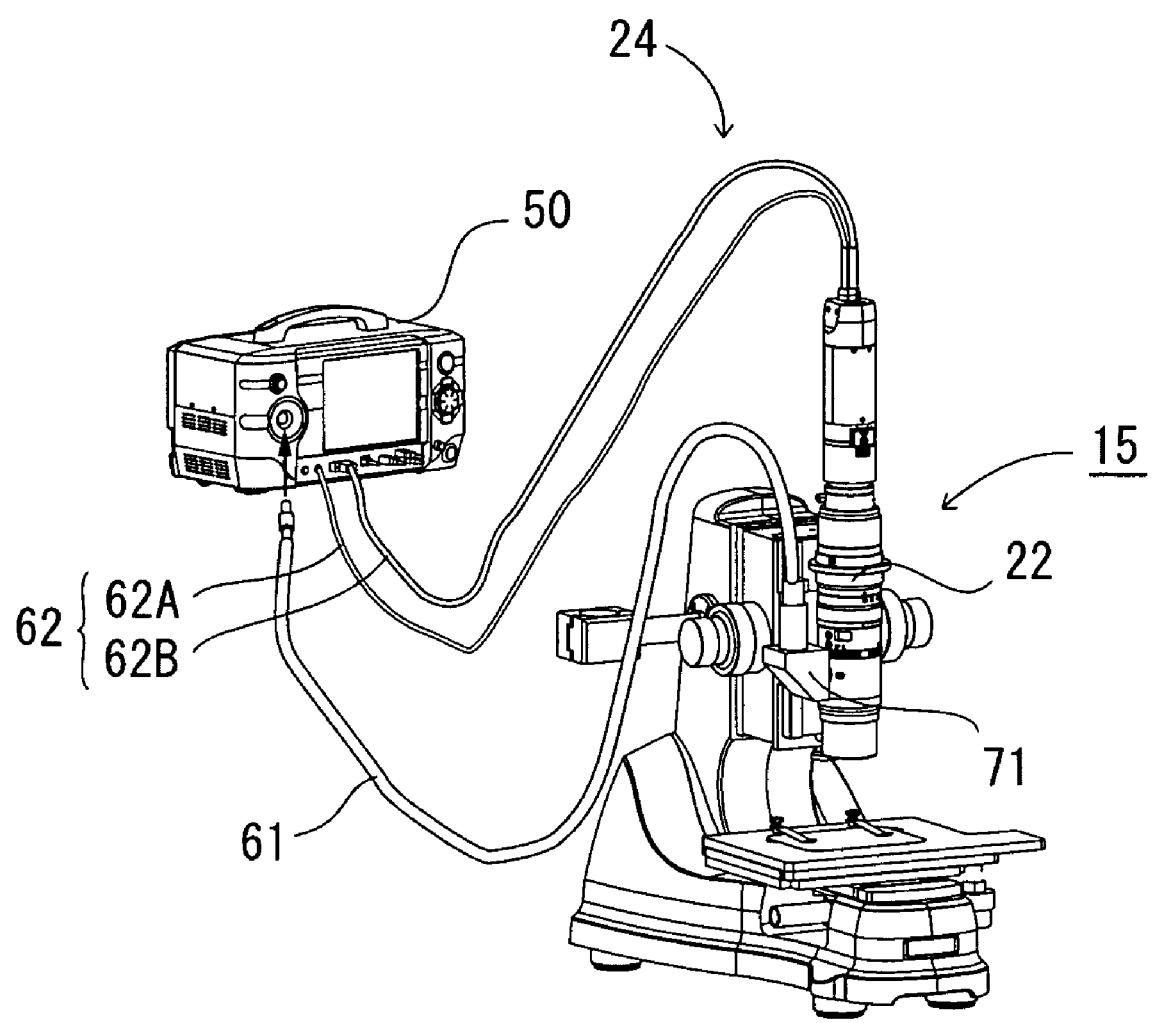
FIG. 3D is a view illustrating the image pickup system 100 including a head part 15 for magnification observations which includes a coaxial incident illumination device.

FIG. 2A and FIG. 3A are exploded views illustrating configurations of plural head parts 15. FIG. 2B and FIG. 3B are explanation views illustrating states where a head part 15 for high-speed photographing is connected to the main body part 50 through the cable part 24. FIG. 2C and FIG. 3C are explanation views illustrating states where a head part 15 for magnification observations which is equipped with a ring-shaped illumination device is connected to the main body part 50. FIG. 2D and FIG. 3D are explanation views illustrating states where a head part 15 for magnification observations which is equipped with a coaxial incident illumination device is connected to the main body part 50.

As illustrated in these figures, the components constituting the head parts 15 can be changed to be of an attachment type to create various types of variations, which can utilize the single apparatus for various types of applications. In this case, in general, there are configured the head parts 15 for high-speed photographing and for magnification observations. Further, the head part 15 for magnification observations is configured to be able to select ring-shaped illumination or coaxial incident illumination as the illumination unit 60. As described above, the head parts 15 can be used depending on the applications.

(The Head Parts 15)

Each head part 15 includes the image pickup part 10 within the image pickup module 16. The image pickup part 10 includes an image pickup element 12 which electrically reads reflected light which enters it through an optical system from an object S (a sample, a work or the like) as a to-be-inspected object which is illuminated by the illumination unit 60. The image pickup element 12 is utilized for a CMOS, in the example, and may be also utilized for elements such as a CCD. In this case, the image pickup module 16 has a cylindrical shape, as illustrated in FIG. 2A. The image pickup element 12 incorporated in the image pickup module 16, being for either monochrome image pickup or color image pickup, can be utilized. For example, an image pickup element capable of high-definition image pickup, such as a cooled CCD, is for monochrome image pickup and, therefore, plural image pickup modules 16 for monochrome image pickup and for color image pickup can be provided, such that one of them can be properly selected depending on observation applications, which can make the image pickup modules 16 applicable to various types of applications.

(Pixel Shift Unit 14)

The image pickup part 10 can include a pixel shift unit 14 which achieves a high resolution which is higher than the resolution of the CMOS through pixel shift. A pixel shift technique of a single-plate type is described in, for example, JP-A No. S58-111580, and a pixel shift technique of a three-plate type is described in JP-A No. H01-123580. As described in these literatures, the pixel shift is attained, using a piezoelectric element, by physically shifting the element to the spaces between adjacent pixels. Further, for example, an image created by photographing an object S in such a way as to shift the object S by half the pixel pitch and an image created before the shifting can be synthesized to realize a higher resolution. Further, RGB data can be acquired from each pixel, thereby improving the color repeatability.

As representative pixel shift mechanisms, there are CCD driving systems for moving the image pickup element 12 by way of an actuator or the like, LPF inclination systems for inclining an LPF, and lens moving systems for moving a lens, and the like. Pixel shift signals for performing pixel shift are transmitted from the main body part 50 to the head part 15 by way of a pixel-shift signal cable 62A. In general, in cases of magnification observations, an image pickup element with a high resolution tends to be used as an image pickup element for such observations, but, in cases of performing high-speed image pickup using such an image pickup element with a high resolution, the image pickup element tends to decrease its readout rate. Therefore, in the present embodiment, as an image pickup element usable for both "magnification observations" and "high-speed photographing", an image pickup element having a number of pixels of about 300,000 and having a readout rate usable for high-speed image pickup is employed. In cases of acquiring magnified observation images as static images by using the image pickup element, the pixel shift method is utilized for increasing the resolution, thereby structuring an image pickup unit usable for both the two different observations.

Further, the head parts 15 can be structured such that the lens module 20 and the illumination unit 60 can be replaced depending on applications. As the lens module 20, generally, there are prepared a first lens module 21 incorporating a lens for high-speed photographing and a second lens module 22 incorporating a lens for magnification observations. The illumination unit 60 is prepared depending on the selected lens module 20. In the present example, the second lens module 22 incorporates an illumination optical path 67 as the illumination unit 60 for the second lens module 22, while there is separately prepared a first lens illumination unit 66 for illuminating the area to be photographed with the first lens module 21 as the illumination unit 60 for the first lens module 22, such that they can be mounted to the head parts 15.

As described above, in the head parts 15, the image pickup module 16 incorporates the image pickup part 10, and the lens module 20 is formed to be of an attachment type. Further, the illumination units 60 are formed to be of a type incorporated in the lens module 20 or a type mounted to the head part 15 or the lens module 20 separately from the lens module 20.

(The Lens Module 20)

Figure 4:
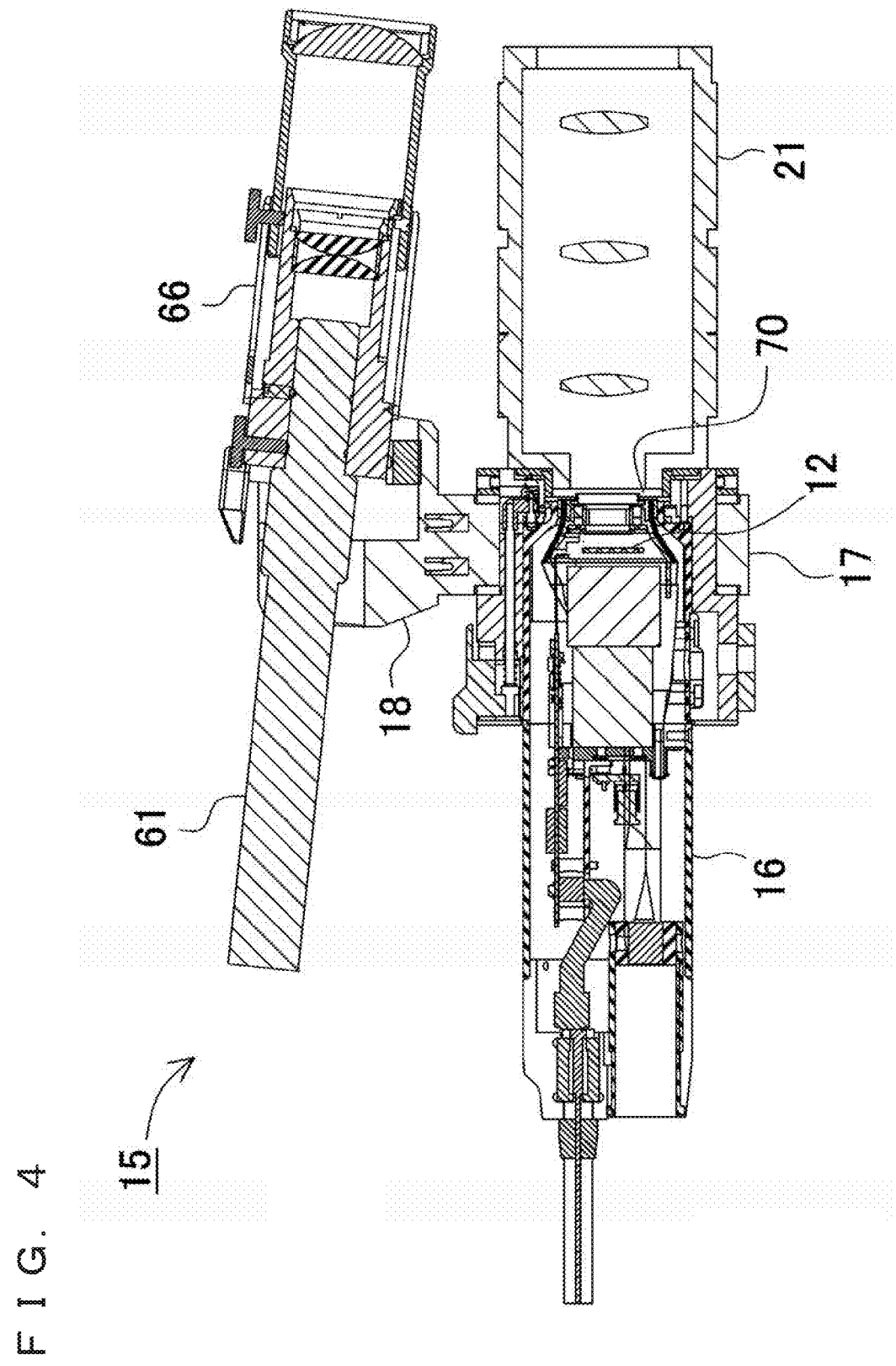
FIG. 4 is a cross-sectional view illustrating a head part 15 including a first lens module 21.
Figure 6:
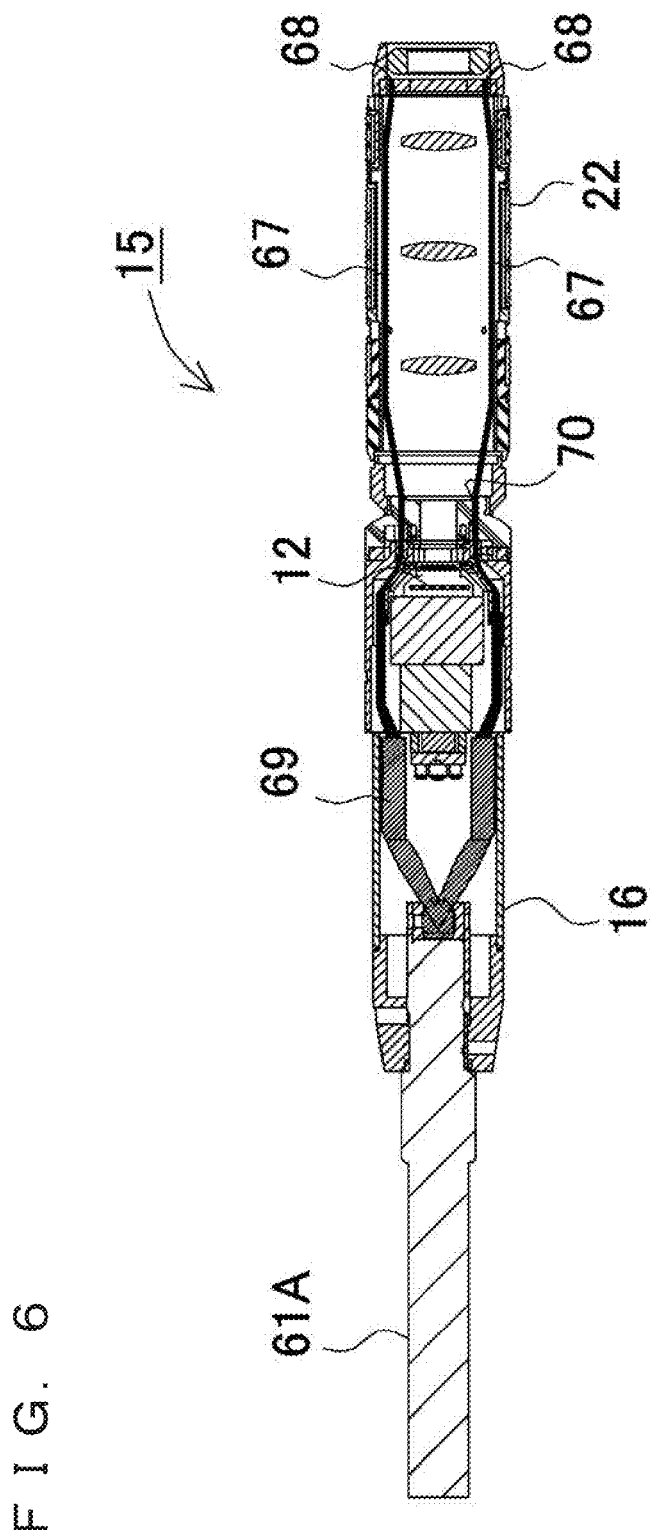
FIG. 6 is a horizontal cross-sectional view taken along the line VI-VI in FIG. 5.

The lens module 20 incorporates an optical lens which is optically coupled to the image pickup element 12. In this case, there are prepared the first lens module 21 incorporating the lens for high-speed photographing and the second lens module 22 incorporating the lens for magnification observations. FIG. 4 is a cross-sectional view illustrating the head part 15 including the first lens module 21, and FIG. 5 is a vertical cross-sectional view illustrating the head module 15 including the second lens module 22. Further, FIG. 6 illustrates a horizontal cross-sectional view taken along the line VI-VI in FIG. 6. As illustrated in these figures, the lens module 20 includes plural optical lenses with sizes and curvatures corresponding to demanded magnification ratios and brightness.

(The Illumination Unit 60)

The illumination unit 60 illuminates an object S which forms an image on the image pickup element 12 through the lens module 20. The light source for the illumination unit 60 is incorporated in the main body part 50, and the illumination light therefrom is transmitted through the cable part 24 to the illumination unit 60 in the head part 15. The illumination unit 60 used herein can be either of a type incorporated in the head part 15 or a type separated from the head part 15 such that it is attachable and detachable to and from the head part 15. In this case, the first lens illumination unit 66 which is the illumination unit 60 for the first lens module 21 is configured to be separated from the head part 15, while the illumination optical path 67 (the ring-shaped illumination device) which is the illumination unit 60 for the second lens module 22 is configured to be of a type incorporated in the second lens module 22.

(The First Lens Illumination Unit 66)

The first lens illumination unit 66 is connected, at its rear end, to the illumination-light supply cable 61. Further, the first lens illumination unit 66 is provided with an axial hole opened near the rear end thereof and secured to an inclination shaft 19 of an illumination unit mount 18, as illustrated in cross-sectional views of FIG. 4 and FIG. 10 described later. This allows the first lens illumination unit 66 to sway about the axial hole in its rear end portion.

(The Mount Portion of the First Lens Illumination Unit 66)

Figure 7A:
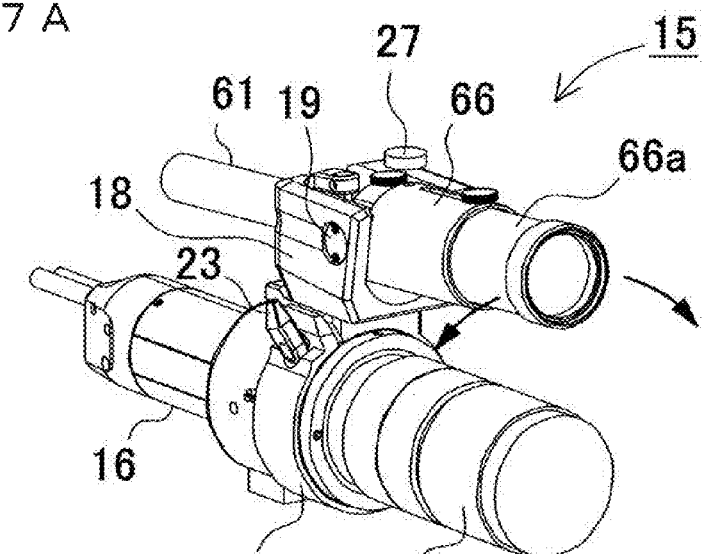
FIGS. 7A to 7C are perspective views illustrating a head part 15 including a first lens illumination unit 66 and the first lens module 21 secured to each other.
Figure 7B:
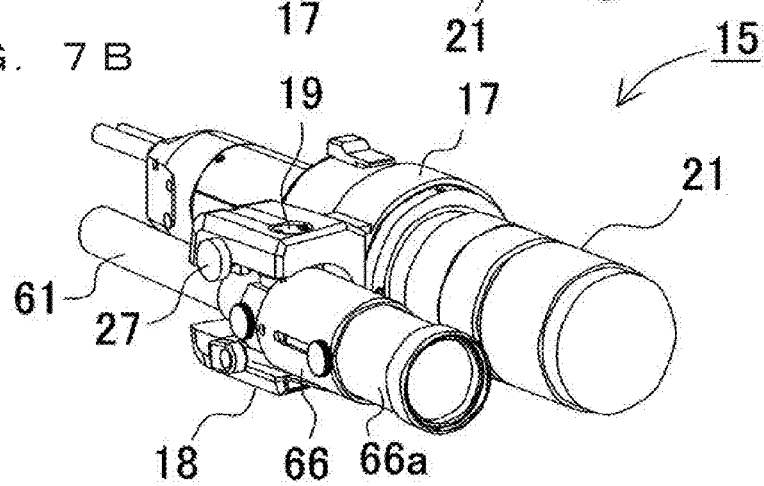
Figure 7C:
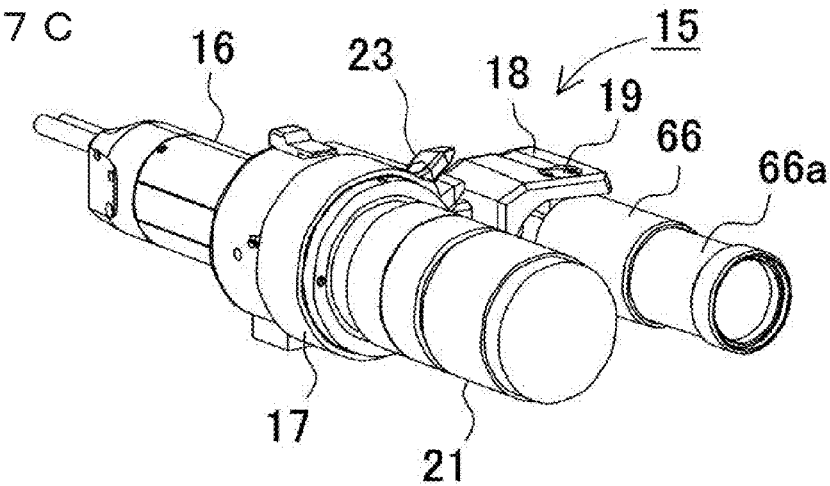

FIGS. 7A to 7C are perspective views illustrating the head part 15 including the first lens illumination unit 66 and the first lens module 21 secured to each other. As illustrated in these figures, the first lens illumination unit 66 is secured to the upper portion of the first lens module 21. More specifically, the illumination unit mount 18 having an opened upper surface and having an angular-U-shaped cross section is secured to a rotational ring 17 secured rotatably to the cylindrical periphery of the first lens module 21. Further, the first lens illumination unit 66 is secured to the illumination unit mount 18, such that it can be inclined about the inclination shaft 19.

Since the rotational ring 17 is made rotatable, as illustrated in FIGS. 7A to 7C, at a state where the first lens illumination unit 66 is secured to the first lens module 21, the first lens illumination unit 66 is rotatable about the cylindrical first lens module 21, namely the optical axis of the image pickup element 12, around them. Further, there is provided a lock lever 23 such that the rotational ring 17 can be maintained at an arbitrary rotational position with respect to the first lens module 21. This enables arbitrarily adjusting the direction of irradiation with the illumination light, which enables changing the position of the first lens illumination unit 66 to prevent the illumination light from being obstructed, for example, in cases where the illumination light is partially shaded due to the position at which the head part 15 is placed.

(The Illumination-Unit Inclination-Angle Adjustment Unit)

Figure 8A:
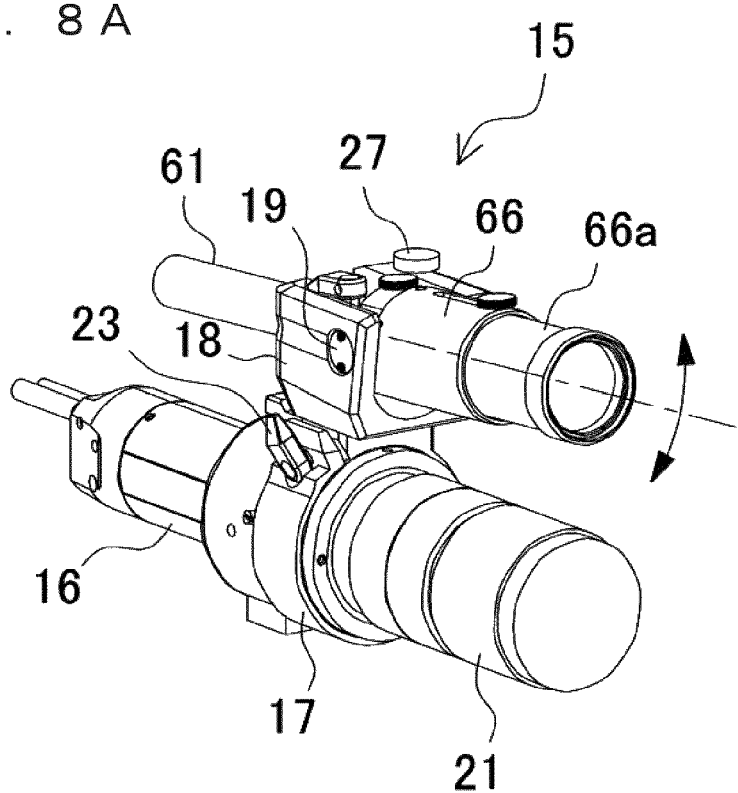
FIGS. 8A and 8B are perspective views illustrating the inclination of the first lens illumination unit 66.
Figure 8B:
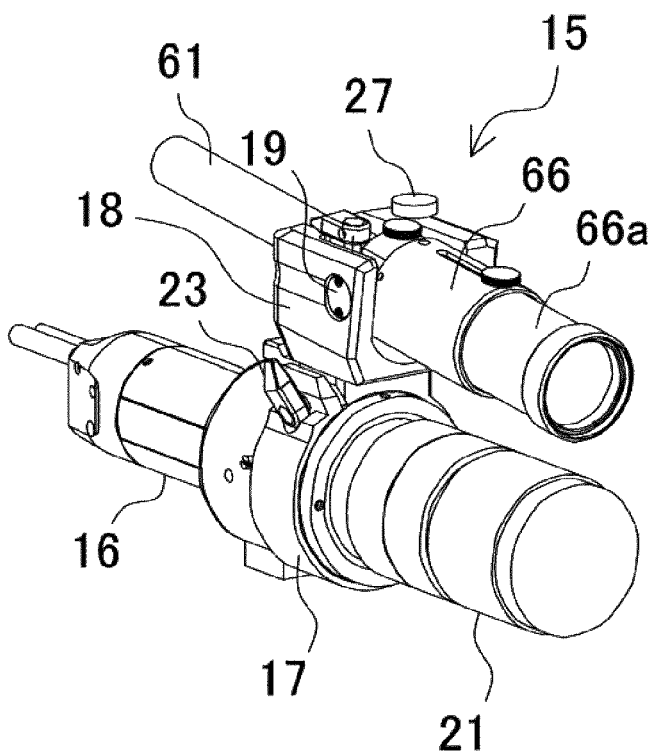
Figure 9:
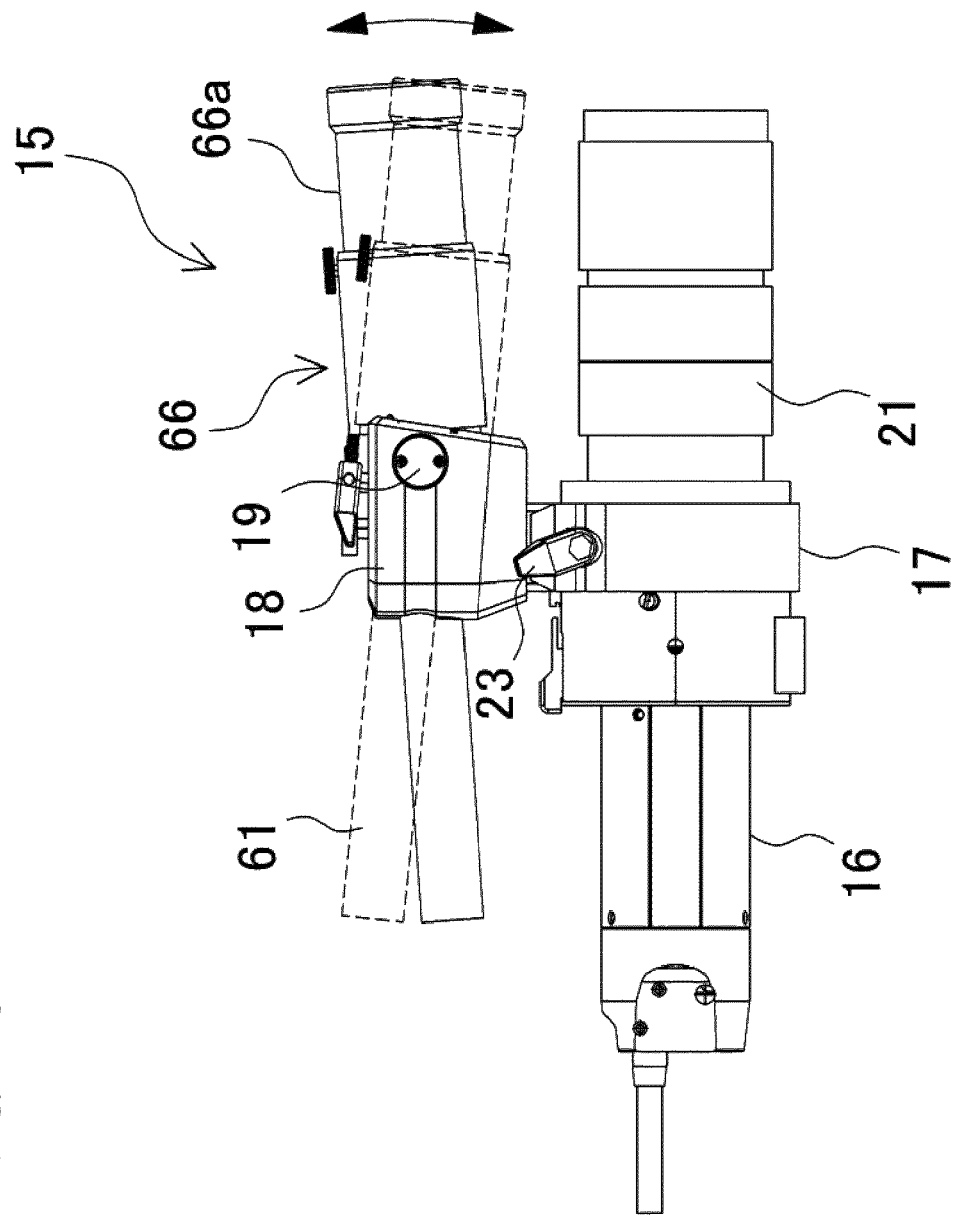
FIG. 9 is a side view illustrating the inclination of the first lens illumination unit 66.
Figure 10:
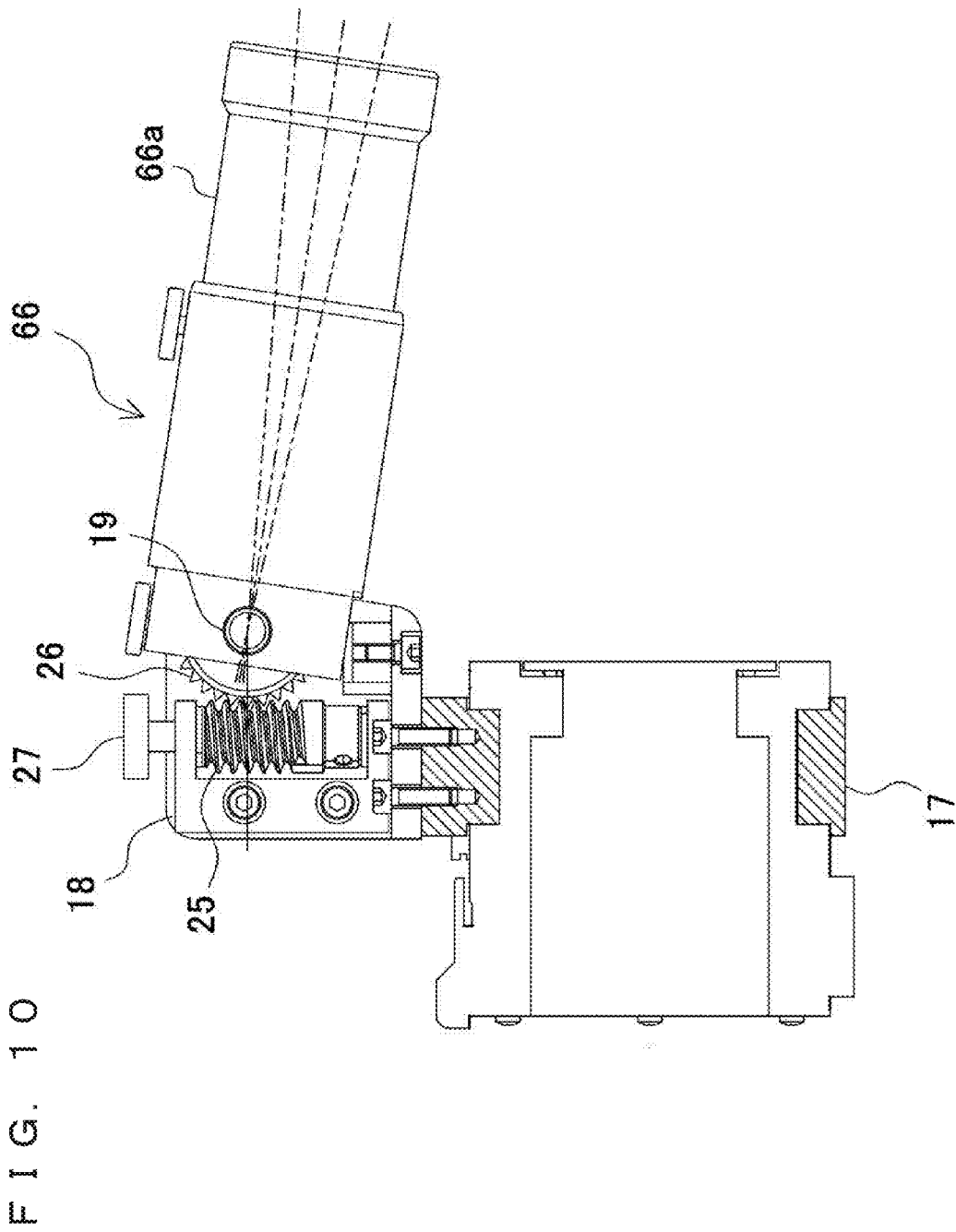
FIG. 10 is a view illustrating an example of an illumination-unit inclination-angle adjustment unit.
Figure 11A:
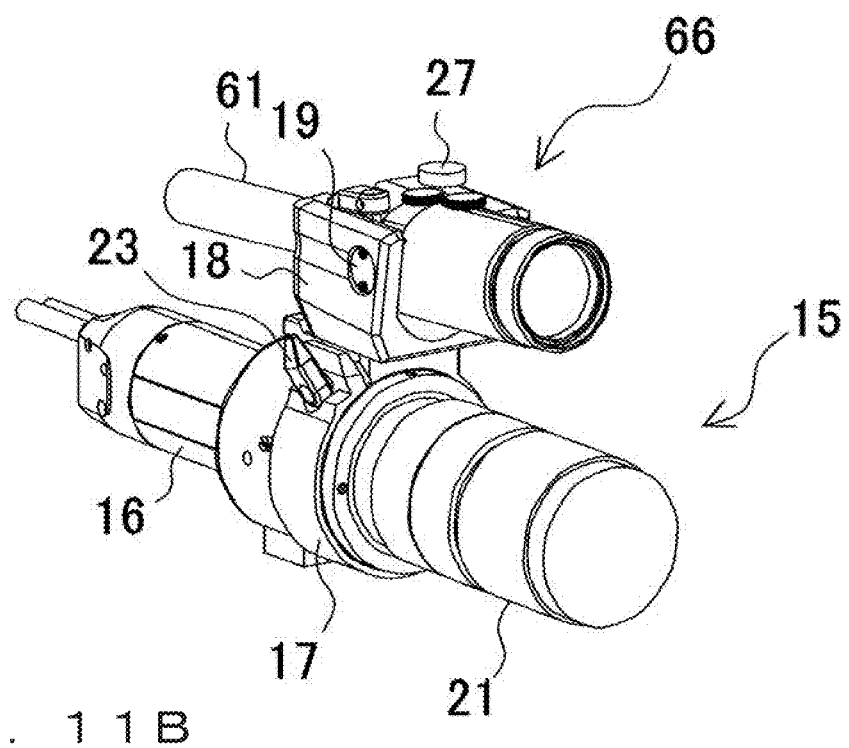
FIGS. 11A and 11B are perspective views illustrating a telescope type lens in the first lens illumination unit 66.
Figure 11B:
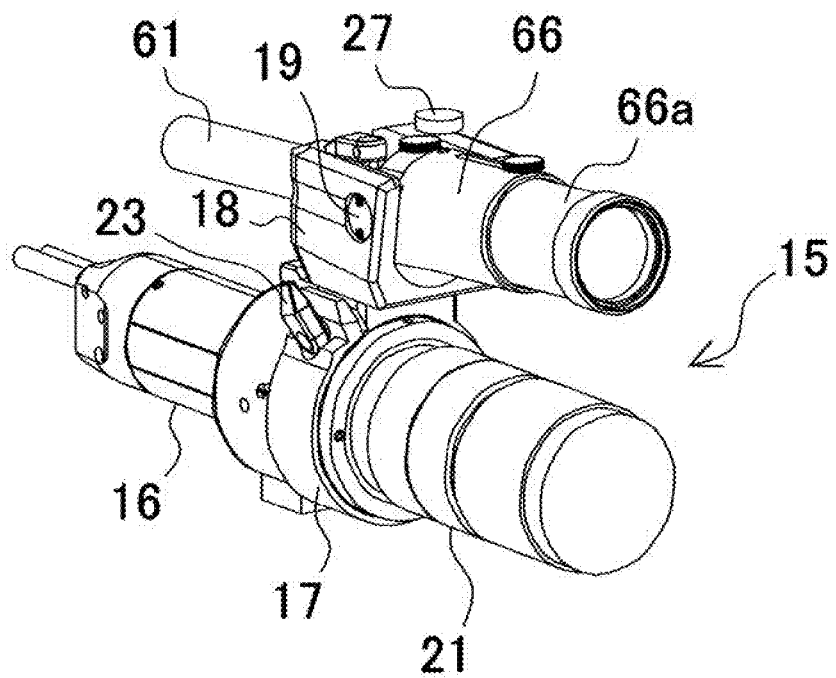

Each head part 15 includes an illumination-unit inclination-angle adjustment Unit which adjusts the relative inclination angle of the first lens illumination unit 66 with respect to the first lens module 21. Each of FIG. 8A, FIG. 8B, FIG. 9 and FIG. 10 illustrates an example of the illumination-unit inclination-angle adjustment unit. In these figures, FIGS. 8A and 8B are perspective views illustrating the inclination of the first lens illumination unit 66, and FIG. 9 is a side view of the same. FIG. 10 is a cross-sectional view of a portion of FIG. 9 and is a vertical cross-sectional view illustrating the portion of the illumination-unit inclination-angle adjustment unit, taken along a cut position different from that of FIG. 4.

The illumination-unit inclination-angle adjustment unit illustrated in the figures is configured by a worm gear 25 provided in the illumination unit mount 18 and a worm wheel 26 provided at the rear end of the first lens illumination unit 66. An inclination-angle adjustment screw 27 is secured to the end (the top portion in FIG. 10) of the worm gear 25. By rotating the inclination-angle adjustment screw 27, the worm gear 25 is rotated. By rotating the worm wheel 26 engaged with the worm gear 25, the first lens illumination unit 66 is caused to sway about the inclination shaft 19 to be able to adjust the inclination angle thereof with respect to the first lens module 21. By employing such a configuration, even if the user arbitrarily sets the distance between the first lens module and the object S (the working distance of the illumination light), it is possible to easily set the inclination angle to an angle which enables properly illuminating the object S according to this distance. This configuration of the worm gear 25 enables performing accurate angle adjustments and, also, enables maintaining the inclination angle without providing a specific securing mechanism, thereby preventing the inclination angle from being changed due to the weight of the first lens illumination unit 66 itself, since no motive power can be transmitted from the first lens illumination unit 66.

Further, the first lens illumination unit 66 includes a telescope type lens 66a suitable for projection of light in order to form spot light. Namely, the cylindrical-shaped lens portion is formed to be of a nest type, which enables adjustments of the diameter of the spot light. It is possible to protrude the telescope type lens 66a from a state illustrated in FIG. 11A to a state illustrated in FIG. 11B. The spot diameter can be increased with decreasing amount of the protrusion thereof and can be decreased with increasing amount of the protrusion thereof. This enables formation of spot light by converging the illumination light. Particularly, for high-speed photographing applications, the working distance of the illumination light is relatively larger, and it is possible to perform irradiation with spot light to effectively attain irradiation with the illumination light with a sufficient illuminance.

(The Illumination Optical Path 67)

The illumination optical path 67 for irradiation with the illumination light for the second lens module 22 is incorporated in the second lens module 22 in the head part 15, as illustrated in FIG. 5 and FIG. 6. The illumination optical path 67 branches the illumination light from an optical fiber 61A which is the illumination-light supply cable 61 and includes plural lighting parts 68 placed in an annual shape around the periphery of the head part 15, thereby forming a ring-shaped illumination device. Therefore, the image pickup module 16 includes optical fiber branch paths 69 for branching the illumination light propagated from the illumination-light supply cable 61, as illustrated in a horizontal cross-sectional view of FIG. 6.

Once the illumination light propagated from the illumination-light supply cable 61 is guided from the rear end portion of the image pickup module 16 to the inside thereof, the illumination light is temporarily branched in two directions by the optical fiber branch paths 69 and, then, is dispersed in an annular shape at the tip end portion of the image pickup module 16, namely at its optical coupling surface 70 which is a surface of the image pickup module 16 which is coupled to the second lens module 22. As the optical waveguide for guiding the illumination light to the optical coupling surface 70, optical fibers are incorporated inside of the optical fiber branch paths 69. Further, the temporal branching of the illumination light is performed in order to place the image pickup part 10 at the center portion of the image pickup module 16, and the branched illumination light propagates through the optical waveguide in the optical fiber 61A and is guided to the peripheral portion of the optical coupling surface 70 of the image pickup module 16. Also at the portion where the image pickup module 16 and the second lens module 22 are coupled to each other, the optical coupling surface 70 of the image pickup module 16 is optically coupled to the optical coupling surface of the second lens module 22 and, similarly, the illumination light is propagated through the optical waveguide such as the optical fiber 61A provided inside the second lens module 22 and is guided to the lighting parts 68 provided at the incidence end surface of the second lens module 22.

The lighting parts 68 are provided in an annular shape around the incidence surface of the second lens module 22, in the form of plural blocks. Light interception control can be performed on the illumination light at any position in the optical waveguide (in this example, in the main body part 50 as will be described later), which enables changeover between entire illumination for lighting all the lighting parts 68 and side illumination for lighting some of the lighting parts 68, such as ¼ of them. By partially lighting some of the lighting parts 68, a shadow on the surface of the object occurs, thereby creating a stereoscopic image having an emphasized concave and convex appearance. Further, the lighting pattern for the lighting parts 68 can be changed, thereby changing the shadow in the created magnified observation image. By utilizing this, it is possible to preliminarily prepare plural lighting patterns (for example, combinations of entire peripheral illumination for lighting the entire periphery of the lighting parts 68, side illumination for partially lighting left, right, upper and lower portions of the lighting parts 68, such as ½ or ¼ of them, incident illumination and transmission illumination, the presence or absence of diffusion and polarization filters, and the like), to briefly capture images while successively changing over among the lighting patterns, and to display these images in a list on the display part for the user to select a preferable image therefrom, such that image pickup for general magnified observation images is performed with the lighting pattern for the selected image. With this method, desirable images can be achieved while user views the images displayed on the screen of the display part 52 without being particularly aware of the way of illumination.

Further, in the example of FIG. 6, the illumination-light supply cable 61 is connected to the image pickup module 16 in the head part 15 to propagate the illumination light to the second lens module 22 through the optical fiber branch paths 69.

(Coaxial Incident Illumination Adaptor 71)

On the other hand, in cases of coaxial incident illumination, a coaxial incident illumination adaptor 71 is mounted to the second lens module 22, as illustrated in FIG. 2A, D and the like. The coaxial incident illumination adaptor 71 causes the illumination light to enter the second lens module 22 from the side thereof and, then, causes it to be reflected by plural mirrors to enter the image pickup element 12 such that it is coincident with the optical axis of the image pickup element 12. This is effective to bright-field observations and the like. In this case, as illustrated in FIG. 2A, the illumination-light supply cable 61 is connected to a connector protruded from the side of the second lens module 22.

(The Cable Part 24)

On the other hand, the cable part 24 includes the illumination-light supply cable 61 for coupling a illumination light source 64 in the main body part 50 to the illumination unit 60 in the head part 15 to irradiate the to-be-inspected object with the illumination light from the illumination light source 64, and the signal transmission cable 62 for transmitting image-pickup control signals from the image-pickup control part 13 in the main body part 50 to the image pickup element 12 in the head part 15 and also for transmitting image signals from the image pickup element 12 to the image processing part 81 in the main body part 50. As the illumination-light supply cable 61, it is possible to employ an optical fiber 61A suitable for transmission of light. Further, as the signal transmission cable 62, it is possible to employ a metal line with excellent conductivity such as a cupper wire suitable for transmission of electric signals.

The cable part 24 is connected at its one end to the head part 15 and, also, is connected at the other end to a connection terminal in the main body part 50. On the other hand, the main body part 50 is provided with terminal holes which enable inserting, therein, the respective branch connection terminals of the cable part 24.

In the example of FIG. 2A, among the head parts 15 for applications of magnification observations, the head part 15 of type employing ring-shaped illumination as the illumination unit 60 integrally incorporates the illumination unit 60 and, therefore, as illustrated in FIG. 2C, the illumination-light supply cable 61 and the signal transmission cable 62 are integrated into the cable part 24. The cable part 24 is secured at its one end to the rear end of the image pickup module 16 constituting the head part 15 and, also, is branched, at its side connected to the main body part 50, into the illumination-light supply cable 61 and the signal transmission cable 62. Further, the signal transmission cable 62 is branched into a pixel-shift signal cable 62A for transmitting pixel-shift signals and a control signal cable 62B for transmitting control signals and image signals. FIG. 2C illustrates a state where the head part 15 is connected to the main body part 50 through the cable part 24 with the configuration. By integrating the cables into the cable part 24 to some degree as described above, it is possible to offer the advantage of facilitating routing it. However, it is not necessarily necessary to integrate the cables into the cable part 24 as described above and, as illustrated in FIG. 3C, the cable part 24 can be branched from the head part 15 into the illumination-light supply cable 61 and the signal transmission cable 62 (the pixel-shift signal cable 62A and the control signal cable 62B) such that they are connected to the main body part 50 separately from one another.

On the other hand, in the case of the head part 15 of the type having the separate illumination unit 60 which is mounted thereto, the illumination unit 60 is directly connected to the main body part 50 through the illumination-light supply cable 61 without integrating the cables into the cable part 24. More specifically, in the case of the head part 15 for high-speed photographing applications, as illustrated in FIGS. 2A and B, the illumination-light supply cable 61 is connected at its one end to the rear end of the first lens illumination unit 66 and, also, is connected at the other end to the main body part 50. In this case, as the cable part 24 from the image pickup module 16, as illustrated in FIGS. 2A and B, it is possible to employ a cable part 24 of a type having an illumination-light supply cable 61 and a signal transmission cable 62 which are partially integrated with each other. In this case, as illustrated in FIG. 2B, the illumination-light supply cable 61 which is a branch of the cable part 24 of the image pickup module 16 is not connected to the main body part 50 and, instead thereof, the illumination-light supply cable 61 from the first lens illumination unit 66 is connected thereto.

Further, among the head parts 15 for magnification observation applications, the head part 15 of type employing coaxial incident illumination as the illumination unit 60 is adapted such that the illumination-light supply cable 61 is connected at its one end to a coaxial incident illumination adaptor 71 through an incident illumination coupler 72 and is connected at the other end to the main body part 50, as illustrated in FIG. 3D. This enables transmitting the illumination light from the illumination light source 64 in the main body part 50 to the illumination unit 60. In this case, similarly, it is possible to employ a cable part 24 of a type having an the illumination-light supply cable 61 and a signal transmission cable 62 which are partially integrated with each other, as the cable part 24 from the image pickup module 16, and, as illustrated in FIG. 2D, the illumination-light supply cable 61 which is a branch of the cable part 24 of the image pickup module 16 is not connected to the main body part 50 and, instead thereof, the illumination-light supply cable 61 from the coaxial incident illumination adaptor 71 is connected thereto.

(The Main Body Part 50)

The main body part 50 includes the illumination light source 64, the image-pickup control part 13, the image processing part 81, a memory part 53 and an interface part 54.

(The Illumination Light Source 64)

The illumination light source 64 is controlled in lighting by the image-pickup control part 13. More specifically, in cases of employing a metal halide lamp or a halogen lamp, a mask plate (not illustrated) for entirely or partially masking the illumination light for intercepting the light is placed on the optical path leading to the connection terminal which is connected to the illumination-light supply cable 61. The mask plate has a shape constituted by two substantially-arc shapes with smaller and larger sizes which are coupled to each other with their back sides faced to each other, and this mask plate is mounted rotatably about a rotational shaft. The larger arc-shaped portion is provided with open windows which are an entire-periphery illumination open window with a substantially circular shape and a side-illumination open window with a substantially arc shape. Further, the smaller arc-shaped portion is provided with gear grooves at its peripheral side surface portion. The mask plate is coupled to the illumination light source 64 rotatably about the rotational shaft and is rotated by a motor. The motor includes a worm gear secured to its rotational shaft and is placed such that the gear portion of the worm gear engages with the gear grooves provided in the smaller arc-shaped portion in the mask plate. If the motor is rotated to cause the mask plate to rotate, the entire-periphery illumination open window or the side-illumination open window will be aligned with the illumination-light supply cable 61. This will cause the illumination-light supply cable 61 to be connected to the illumination light source 64, thereby enabling irradiation with the illumination light from the illumination unit 60.

As the illumination light source 64, it is possible to preferably employ a metal halide lamp. Such a metal halide lamp emits light by discharging a high-tension current within a valve filled with a xenon gas, for example, unlike a halogen lamp which emits light if an electric current is flowed through a filament therein. More specifically, a metal halide lamp is a high-luminance discharge lamp which is filled with mercury and a halogenated metal and includes a light emission tube filled with mercury, a rare gas and a halogenated light emitting metal (mainly, iodide metal). Such a lamp has a long life and is excellent in energy efficiency, thereby offering a higher illuminance with lower electric power consumption. Particularly, in cases of high-speed photographing applications, the working distance is larger than in cases of magnification observation applications and, furthermore, photographing is performed with an extremely short unit of frames, which requires high-power illumination for attaining a sufficient luminance. Therefore, a metal halide lamp is suitable for high-speed photographing applications. Further, a metal halide lamp can be also used for magnification observation applications. In this case, there is no need for an illuminance as high as that for high-speed photographing applications and, therefore, a lamp which exhibits excellent color rendering characteristics but exhibits a lower illuminance, more specifically, a metal halide lamp of a type which exhibits intensified red-color components, is employed. Also, a mercury lamp or a xenon lamp can be employed as a first light source and, also, a halogen lamp or an LED can be employed as a second light source, as well as a metal halide lamp. An LED generates less infrared components than a halogen lamp, a metal halite lamp and the like and, therefore, offers the advantage of less heat generation to the object even in cases of irradiation with the same amount of light. Further, an LED is relatively inexpensive and has a long life, and also has excellent response characteristics with respect to the input and, therefore, such an LED can be controlled in lighting without using a mask plate for intercepting the illumination light and, also, can be turned on and off in such a way as to sufficiently follow high-speed photographing at, for example, 1000000 fps.

(Light-Source Determination Unit 65)

In order to enable properly lighting and driving different illumination light sources 64 as described above, the main body part 50 is adapted to enable changing over the driving conditions such as the driving electric current, according to the type of the illumination light source 64 connected thereto. This changeover can be manually or automatically performed. Particularly, in the example illustrated in FIG. 1, the main body part 50 is provided with the light-source determination unit 65 which determines the type of the illumination light source 64 mounted thereto. By providing the light-source determination unit 65, the main body part 50 is enabled to automatically grasp the type of the illumination light source 64 connected thereto and to perform proper driving and controlling by changing over the driving conditions to proper driving conditions for driving respective light sources. For example, it is possible to perform changeover of the driving electric current value according to the metal halite lamp, control of the output of the illumination light and the like, which can eliminate the burdens on the user for changing over the power supply wattage and the like each time and also can eliminate setting errors, thereby enabling the user to use the respective illumination light sources 64 safely and certainly. Further, the main body part 50 can be configured to calculate the times during which the illumination light sources 64 have been lighted, accumulate the usage times of the respective illumination light sources 64, hold the accumulated usage times and urge the user to replace the illumination light sources 64 if the replacement timing approaches.

(The Image-Pickup Control Part 13)

The Image-pickup control part 13 sets, through the operation part 55, the image pickup conditions such as the frame rate, the shutter speed and the like for high-speed photographing, and controls the respective portions according to the set image pickup conditions. More specifically, the image-pickup control part 13 creates image-pickup control signals for driving and controlling the image pickup element 12 in the image pickup part 10 and transmits them to the image pickup part 10. Further, the image-pickup control part 13 controls the ON/OFF of the illumination light source 64 and the interception of the light therefrom. For example, in cases of performing stroboscopic photography, the image-pickup control part 13 outputs synchronization signals synchronized with the photographing for turning on and off the lighting of the illumination light source 64 and performing image pickup with the image pickup element 12, according to the synchronization signals. As described above, the image-pickup control signal 13 transmits, to the illumination light source 64, photographing timing signals synchronized with the start and end time points of each single photography and exposure timing signals synchronized with the exposure start time points for respective frames during photography. Further, in cases of magnification observations, as settings of image-pickup conditions, for example, incident illumination or transmission illumination is selected as emitted light from the ring-shaped illumination device, and entire-periphery illumination or side illumination is selected for the respective illuminations. Further, it is possible to change the way of illumination according to the combination of plural conditions, such as application of diffusion and polarization filters or application of transmitted light (through) without using a filter. These settings can be performed by the user through the operation part 55.

(The Image Processing Part 81)

The image processing part 81 performs image processing on magnified images created through image pickup by the image pickup part 10. For example, the image processing part 81 performs processing for specifying a region, out of an image of an object being displayed on the display part 52, and calculating the area thereof or for calculating height differences, distances and angles and the like therein.

(The Display Part 52)

The display part 52 is a display which displays, thereon, images created by photographing, settings and the like. The display part 52 can be constituted by a CRT, a liquid crystal display panel or the like. In the examples of FIG. 2 and FIG. 3, the display part 52 is incorporated in the main body part 50.

(The Memory Part 53)

The memory part 53 holds image data created by photographing, the contents of settings, and the like. Preferably, a high-speed semiconductor memory such as a RAM is employed as a temporal storage area, and a hard disk is used as a data storage area.

(The Operation Part 55)

The operation part 55 is an input device which enables the user to perform inputs on the basis of the screen pages displayed on the display part 52. The operation part 55 is connected to the main body part 50 through a cable or in a wireless manner or is secured to the main body part 50. In the examples of FIG. 2 and FIG. 3, the operation part 55 is configured by a console connected thereto in a wireless manner.

(High-Speed Photographing Applications)

Next, there will be described, in detail, image pickup for magnification observation applications and high-speed photographing applications, using the system 100. At first, high-speed photographing applications will be described. As illustrated in FIG. 2, as the head part 15 for the image pickup system 100, the image pickup module 16 incorporating the image pickup element 12 for color photographing or monochrome photographing is selected, and the first lens module 21 is mounted to the tip end of the image pickup module 16. At this time, the image pickup module 16 and the first lens module 21 are optically coupled to each other, such that the optical axis of the image pickup element 12 incorporated in the image pickup module 16 is coincident with the optical axis of the first lens module 21. Further, the first lens illumination unit 66 as the illumination unit 60 is mounted to the image pickup module 16 or the first lens module 21.

As described above, the first lens illumination unit 66 is formed as a component separated from the first lens module 21 and, also, is made mountable to the head part 15, which can facilitate preparations of the illumination equipment for high-speed photographing which has conventionally involved burdensome operations for installation thereof as a separated component and, also, can simplify adjustment operations therefor with the illumination-unit inclination-angle adjustment unit. In the example of FIG. 2, it is possible to prepare the first lens module 21 to which the first lens illumination unit 66 has been preliminarily secured integrally therewith, which enables mounting only the first lens module 21 to the head part 15, thereby facilitating handling of them.

(Operation Screen Pages)

Figure 12A:
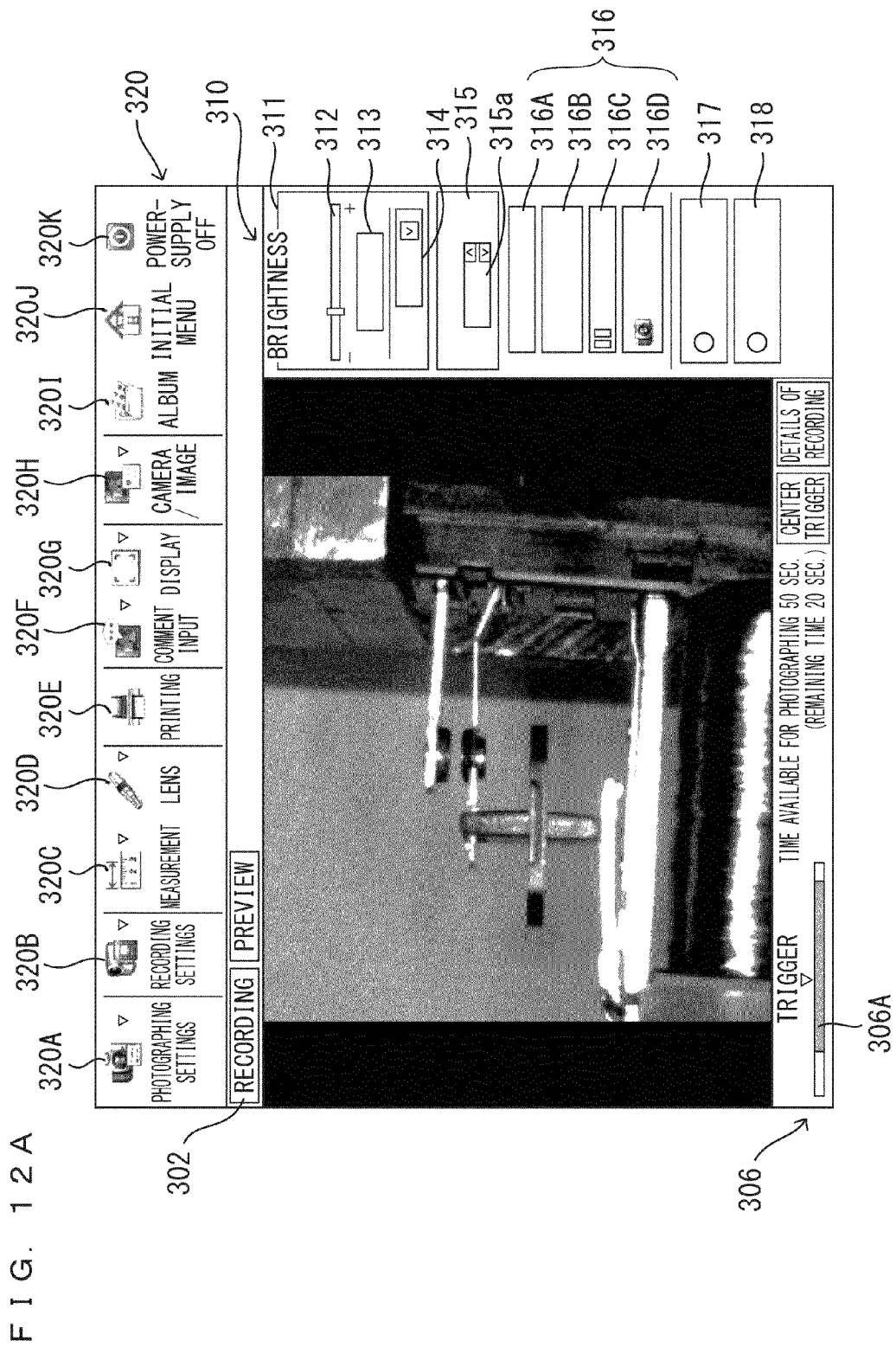
FIG. 12A is a view illustrating a recording screen page for high-speed photographing.
Figure 12B:
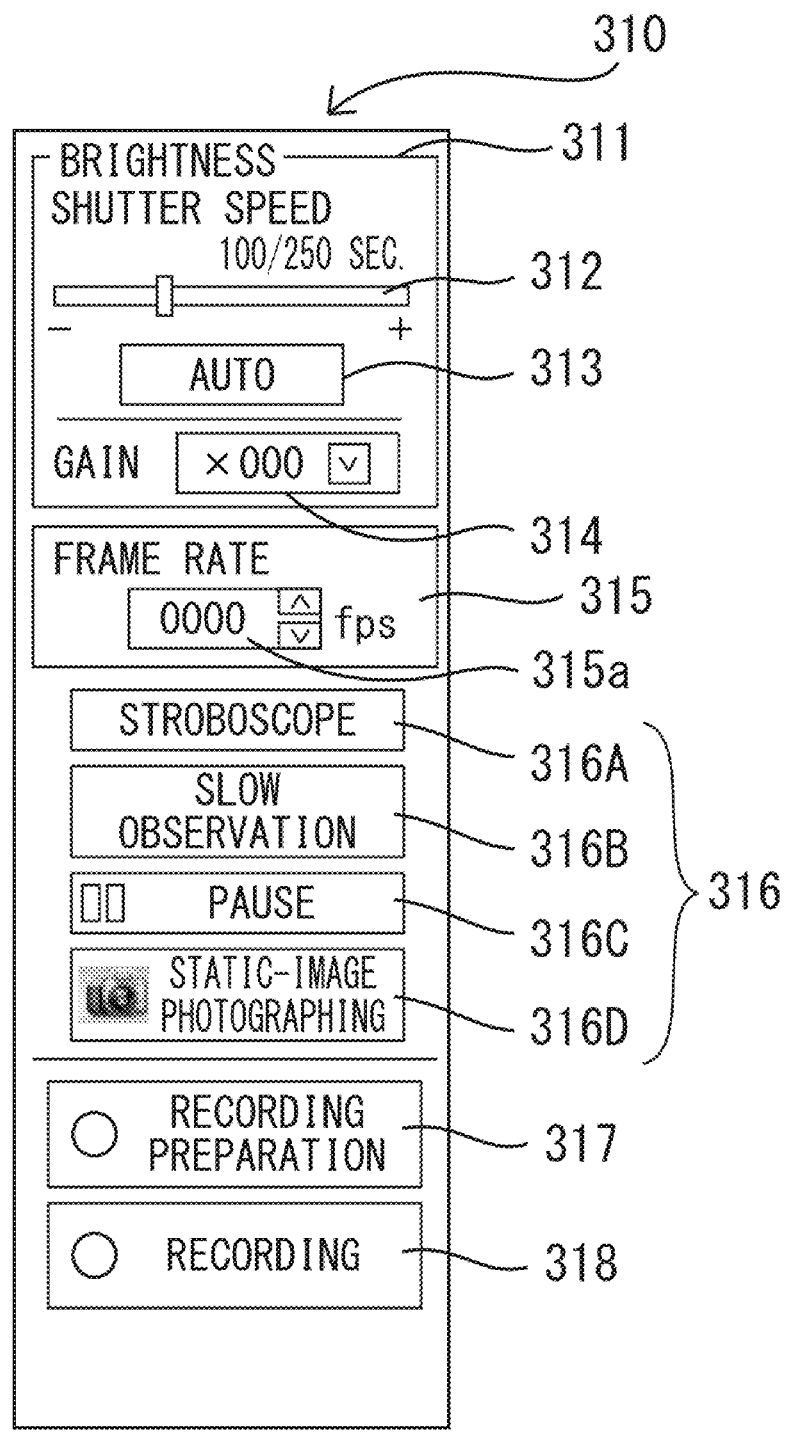
FIG. 12B is a view showing a part of FIG. 12A, showing an example of a operation area 310.
Figure 13B:
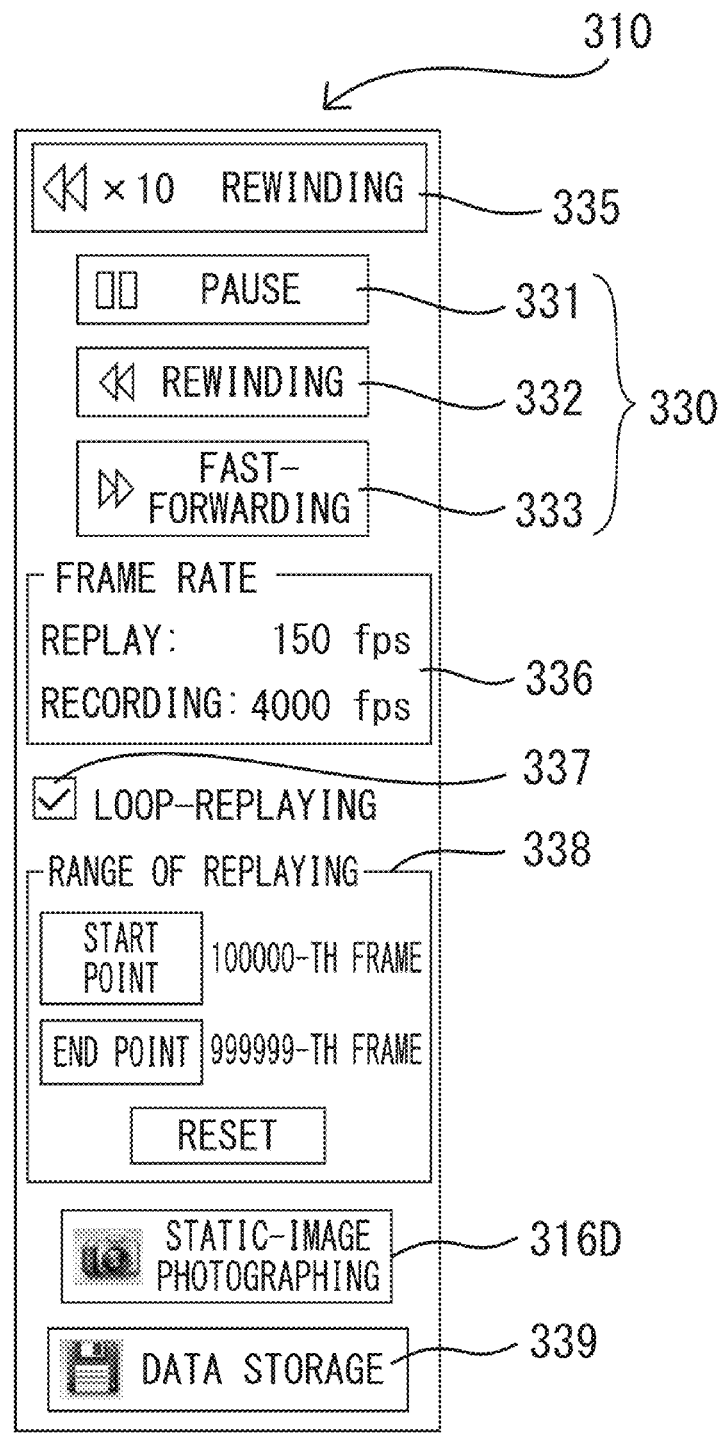
FIG. 13B is a view showing a part of FIG. 13A, showing an example of a operation area 310.

With reference to FIGS. 12A, 12B, 13A and 13B, there will be described procedures for making settings for high-speed photographing. These figures illustrate operation screen pages, as examples of user interface screen pages 300 of an image-pickup element operation program for operating the image pickup system 100. FIGS. 12A and 12B illustrate a recording screen page for high-speed photographing, and FIGS. 13A and 13B illustrate a preview screen page for replaying recorded data created through high-speed image pickup. In the program, image data created by high-speed photographing based on operations on the recording screen page is displayed on the preview screen page. The changeover between the recording screen page and the preview screen page is attained by selecting "Recording" and "Preview" changeover buttons as a screen-page changeover part 302 provided at an upper left position in the screen pages. Further, high-speed photographing basically refers to continuously picking up static images, but, in this case, for convenience, high-speed photographing also may refer to recording of a moving image, since such static images can be treated as a moving image when they are continuously displayed.

ON/OFF operations and specifications of numerical values and command inputs and the like to buttons and input fields which are virtually provided in the aforementioned user interface screen pages are performed through the operation part 55 which is connected to the image pickup system 100 incorporating the image-pickup element operation program or to a computer in which the image-pickup element operation program has been installed. In the present specification, the term "pushing" includes clicking or selecting the buttons for virtually pushing them through the operation part 55, as well as physically touching the buttons for operating them.

The operation screen pages illustrated in these figures are constituted by an image display area 304 for displaying images, an operation area 310 for performing various types of operations which is provided at the right of the image display area 304, and a tool bar 320 for various types of setting which is provided at an upper portion. Further, the screen-page changeover part 302 is provided between the tool bar 320 and the image display area 304, and a status area 306 indicative of the current state is provided under the image display area 304. An image created by photographing is displayed in the image display area 304. In this case, a relay setting device is being displayed as an object S.

The recording screen page illustrated in FIGS. 12A and 12B will be described. The recording screen page is a screen page which is displayed on the display part 52 during high-speed photographing. In the operation area 310, there are placed a brightness setting field 311 for setting the brightness, a frame-rate setting field 315 for setting the frame rate, and operation buttons 316 for executing various types of operations. In the brightness setting field 311, it is possible to set the shutter speed and the gain. The shutter speed can be continuously set by operating a slide bar 312. Further, if an "Auto" button 313 is pushed, the shutter speed can be automatically set to a proper value through calculations. Further, the gain can be set with a numerical value through a numerical-value display field 314. If a drop button provided in the right side of the numerical-value display field 314 is pushed, the numerical values of preset gains are displayed in a drop-down menu. Further, the frame rate can be also specified with a numerical value through a numerical-value display field 315a in the frame-rate setting field 315. By pushing spin buttons provided in the right side of the numerical-value display field 315, it is also possible to increase or decrease the numerical value.

As the operation buttons 316, there are provided a "Stroboscope" button 316A for periodically irradiating an object with intense illumination light and photographing it in synchronization with the illumination light, a "Slow Observation" button 316B for slowly replaying recorded images created as moving images by photographing, a "Pause" button 316C for causing photographing to pause, and a "Static Image Photographing" button 316D for recording, as a static image, an image created by photographing which is being displayed. Further, there are provided a "Recording Preparation" button 317 for making preparations for recording, and a "Recording" button 318 for starting and stopping recording.

In the status area 306, there are displayed the time available for photographing and the remaining time. Further, there is displayed a time gauge 306A indicative of the relationship between trigger set timing and the image-pickup time. In the example of FIGS. 12A and 12B, a center trigger is set and, if a trigger signal as a pre-trigger is inputted during continuous image pickup, the image pickup is continued such that the timing of the trigger is centered, and the image pickup is automatically ended. Further, it is possible to set a start trigger indicative of the start of image pickup, an end trigger indicative of the end of image pickup, a manual trigger for manually specifying the start and end timing of image pickup, and the like.

The tool bar 320 is provided with a photographing setting button 320A for setting photographing conditions mainly for static images, a recording setting button 320B for setting photographing conditions mainly for recording, a measurement button 320C for performing various types of measurements such as measurements of areas and distances in images created by photographing, a lens button 320D for making settings for the lens module 20 used for photographing, a printing button 320E for printing images created by photographing, a comment input button 320F which enables the user to add arbitrary comments to images created by photographing, a display button 320G for making settings for display of images created by photographing, a camera/image button 320H for making settings for the image pickup element 12 and images to be created by photographing, an album button 320I for arranging and browsing images created by photographing, an initial-menu button 320J for setting an initial menu to be displayed at the time of activation of the image-pickup element operation program, and a power-supply button 320K for turning on and off the power supply for the image pickup system 100.

After various types of settings are made through the aforementioned recording screen page, high-speed photographing is performed, and high-speed image-pickup data recorded as static images or a moving image is displayed on the preview screen page.

There will be described the preview screen page illustrated in FIGS. 13A and 13B. The preview screen page is substantially the same as the recording screen page in FIGS. 12A and 12B, in basic placement, and is provided with an image display area 304, an operation area 310, a tool bar 320, a screen-page changeover part 302, and a status area 306. The tool bar 320 has the same contents as those of the tool bar in the recording screen page in FIGS. 12A and 12B.

In the status area 306, there is displayed a time gauge 306B indicating what number the frame being currently displayed in the image display area 304 is (the number of frames). Further, at the right of the time line, there are displayed the total number of frames, the frame number corresponding to the image created by photographing which is being displayed, and the elapsed time.

In the operation area 310 in the preview screen page, there are placed operation buttons 330 including a replay/pause button 331 for replaying recorded moving images, a rewinding button 332 and a fast-forwarding button 333, and there is placed an operating-state display field 335 indicative of the current operating state (in the example of FIGS. 13A and 13B, "10-times speed rewinding") above the operation buttons 330. Further, under the operation buttons 330, there is provided a frame-rate display field 336 in which there are displayed the frame rate during photographing, such as "recording: 4000 fps", and the frame rate during replaying moving images, such as "replaying: 150 fps". As described above, the frame rate during replaying can be made different from that during photographing. Further, on the lower thereof, there is provided a "loop replaying" check box 337 and, if a check mark is provided in this field, a moving image is loop-replayed. Further, under the "loop replaying" check box 337, there is provided a range-of-replaying setting field 338 which also enables specifying the range of replaying. In this case, the start and end points of replaying are specified with numbers of frames. Further, under the range-of-replaying setting field 338, there are provided a static-image photographing button 316D, and a data storage button 339 for storing recorded moving-image data in a nonvolatile memory.

In the example, high-speed image-pickup data recorded by using the recording screen image is temporarily held in a volatile memory, which enables the user to check the high-speed image-pickup data in the preview screen to determine whether or not the data should be stored. In the case where it should not be stored, the user can return to the recording screen page and acquire new high-speed image pickup data. If the data storage button 339 is pushed, a dialogue screen page for storing high-speed image-pickup data will be displayed, which enables the user to store the data in a predetermined folder by naming it.

(Magnification Observation Applications)

Figure 14:
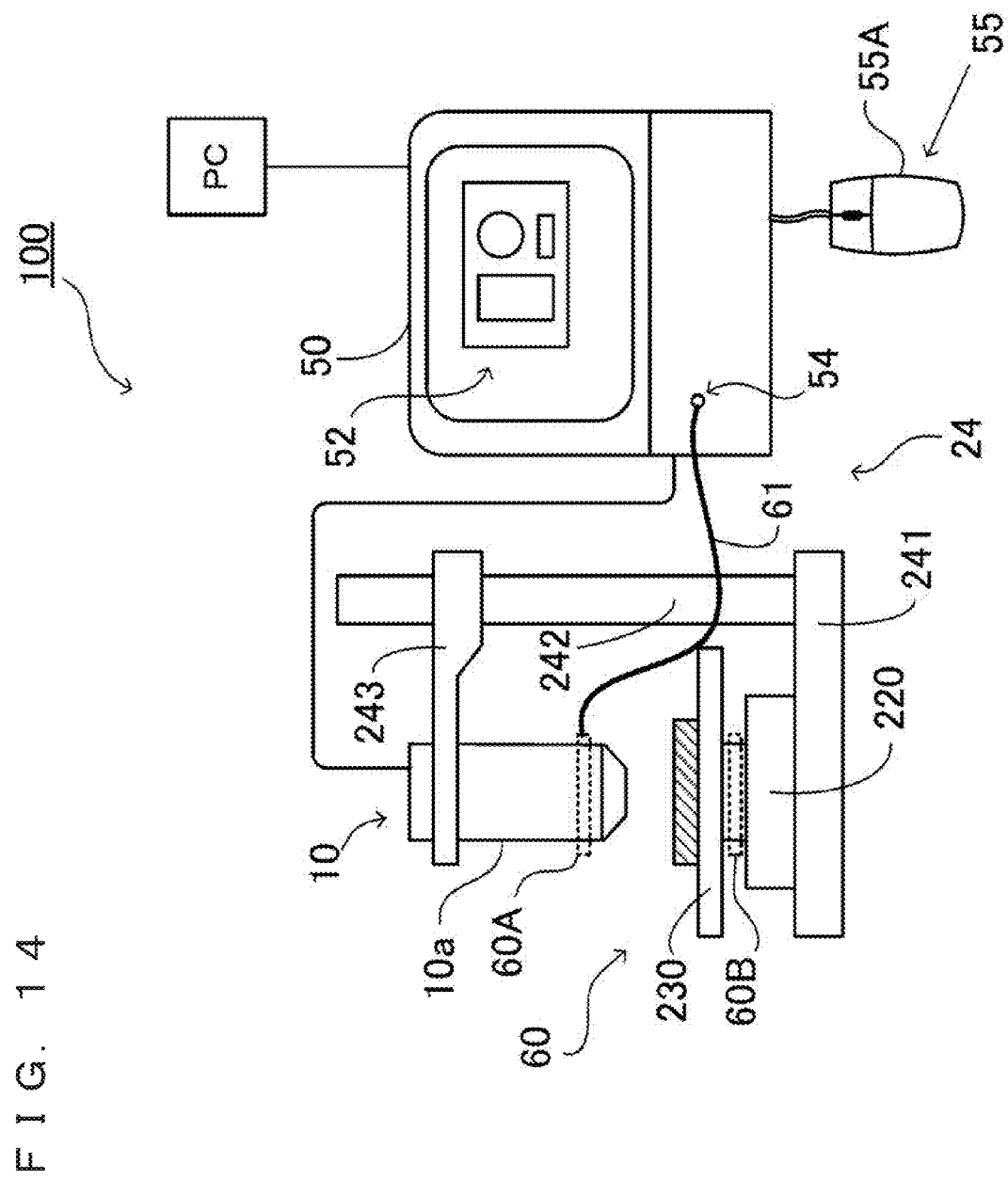
FIG. 14 is an external view of the image pickup system 100.
Figure 15:
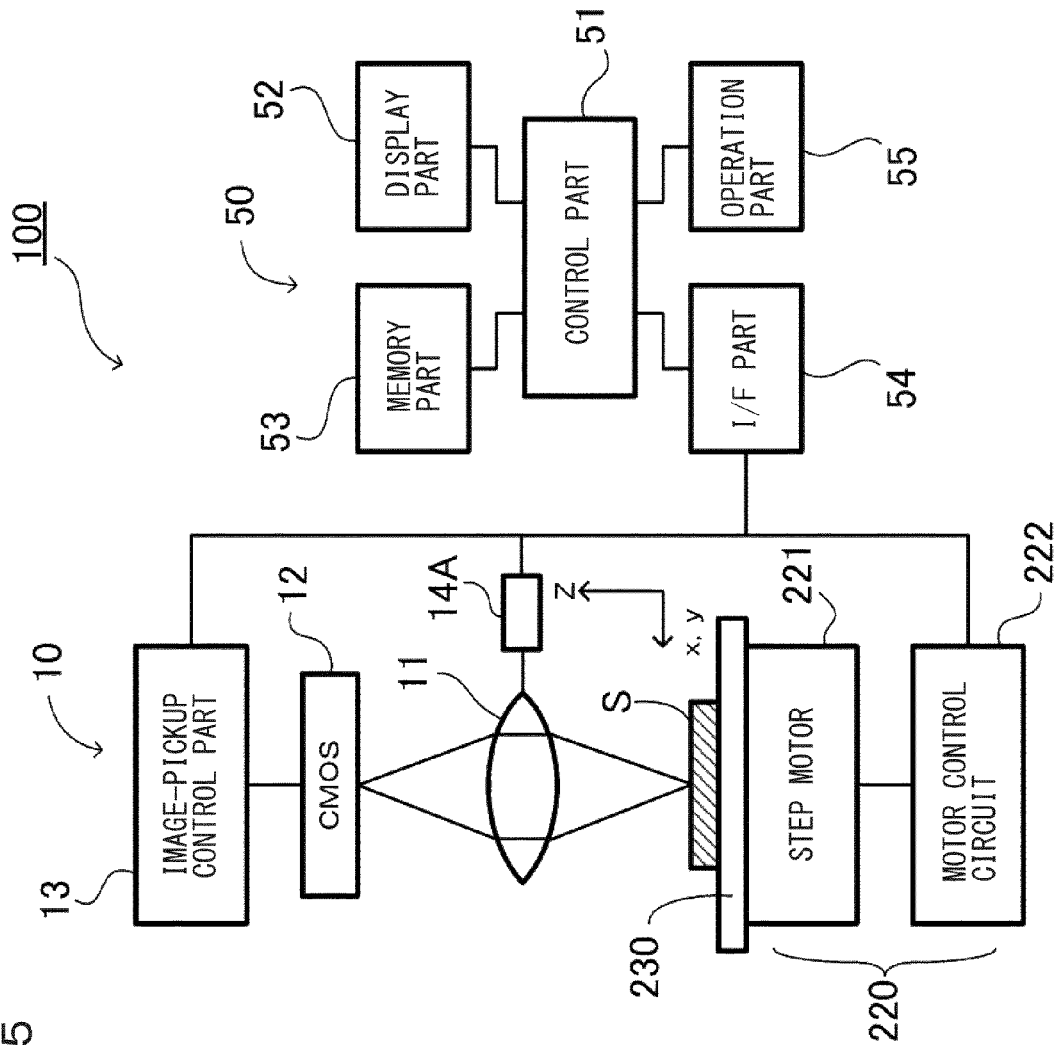
FIG. 15 is a block diagram illustrating an exemplary configuration of the image pickup system 100.

With reference to FIG. 14 and FIG. 15, magnification observation applications will be described. The image pickup system 100 includes the main body part 50 having the display part 52 which displays, thereon, images created by photographing by the image pickup element 12, as illustrated in FIG. 14. Further, as illustrated in FIG. 15, the image pickup system 100 includes a sample fixing part (a stage 230) for fixing an object S, the image pickup element 12 (CMOS) which electrically reads reflected light or transmitted light from the object S which is incident thereto through an optical system 11, and a focus adjustment part (a stage moving up/down machine 220) for changing the distance between the stage 230 and the optical system 11 in the direction of the optical axis for adjusting the focal point. Further, as illustrated in FIG. 15, the main body part 50 includes a focal-length information storage part (the memory part 53) which stores focal-length information about the distance between the stage 230 and the optical system 11 in the direction of the optical axis when the focal point has been adjusted by the stage moving up/down machine 220, along with two-dimensional position information about the object S in a plane substantially perpendicular to the direction of the optical axis. Further, the main body part 50 includes an area setting part (the operation part 55) capable of setting at least a single area out of an image being displayed on the display part 52, and a control part 51 which calculates the average height of the object S in the direction of the optical axis which corresponds to the area set by the operation part 55, on the basis of the focal-length information about a portion or the entire portion of the object S which corresponds to the area set by the operation part 55.

With the image pickup system 100, it is possible to calculate the average height (the depth) of the object S in the direction of the optical axis which corresponds to the specified area, using the image pickup element 12 for electrically reading reflected light or transmitted light from the object S which is incident thereto through the optical system 11.

The image pickup part 10 having the optical system 11 and the image pickup element 12 illustrated in FIG. 14 is mounted to a camera mounting part 243 secured to a supporting column 242 which extends in the vertical direction from a stand table 241. On the stand table 241, there is placed the stage moving up/down machine 220, wherein the stage 230 for placing the object S is mounted to the upper portion of the moving up/down machine 220. The image pickup part 10 and the stage hoisting/lowering machine 220 are connected to the main body part 50 and controlled thereby.

Further, a PC can be connected to the main body part 50 and, also, a magnification-observation operation program can be additionally installed in the PC for enabling operations of the main body part 50 through the PC.

The stage moving up/down machine 220 illustrated in FIG. 15 is constituted by, for example, a step motor 221 and a motor control circuit 222 which controls the step motor 221. The main body part 50 changes the distance between the stage 230, the optical system 11 and the image pickup element 12 in the direction of the optical axis, namely the height of the stage 230 in the z direction in this case, by inputting, to the motor control circuit 222, control data relating to control of the step motor 221. More specifically, the main body part 50 controls the rotation of the step motor 221 for moving up/down the stage 230 for changing the height of the object S (the position thereof in the z direction), by inputting, to the motor control circuit 222, control data required for control of the stage moving up/down machine 220. The stage 230 functions as an observation positioning device for positioning the observation position for the object S. Further, while, in the present embodiment, there has been exemplified a case where the height of the stage 230 is changed for changing the distance between the sample fixing part and the optical system in the direction of the optical axis, the optical system 11 and the image pickup part 10 can be changed in height while the stage 230 is fixed.

The image pickup element 12 is capable of electrically reading the amount of received light at each pixel, out of pixels arranged in a two-dimensional manner in the x direction and in the y direction. The image of the object S which is formed on the image pickup element 12 is converted into electrical signals depending on the amounts of received light at the respective pixels and, then, the electrical signals are converted into digital data to be processed. The main body part 50 stores the digital data as light reception data D in the memory part 53, along with pixel placement information (x, y) as two-dimensional position information about the object S in a plane (the x and y directions) substantially perpendicular to the direction of the optical axis (the z direction).

The illumination unit 60 illustrated in FIG. 14 includes incident illumination 60A for irradiating the object S with incident illumination light and transmission illumination 60B for irradiating it with transmitted light. The incident illumination 60A is connected to the main body part 50 through the illumination-light supply cable 61. The main body part 50 includes a connecter for connecting the illumination-light supply cable 61 thereto and incorporates the illumination light source 64 for transmitting light to the illumination-light supply cable 61 through the connector.

(Operation Screen Pages)

Figure 16:
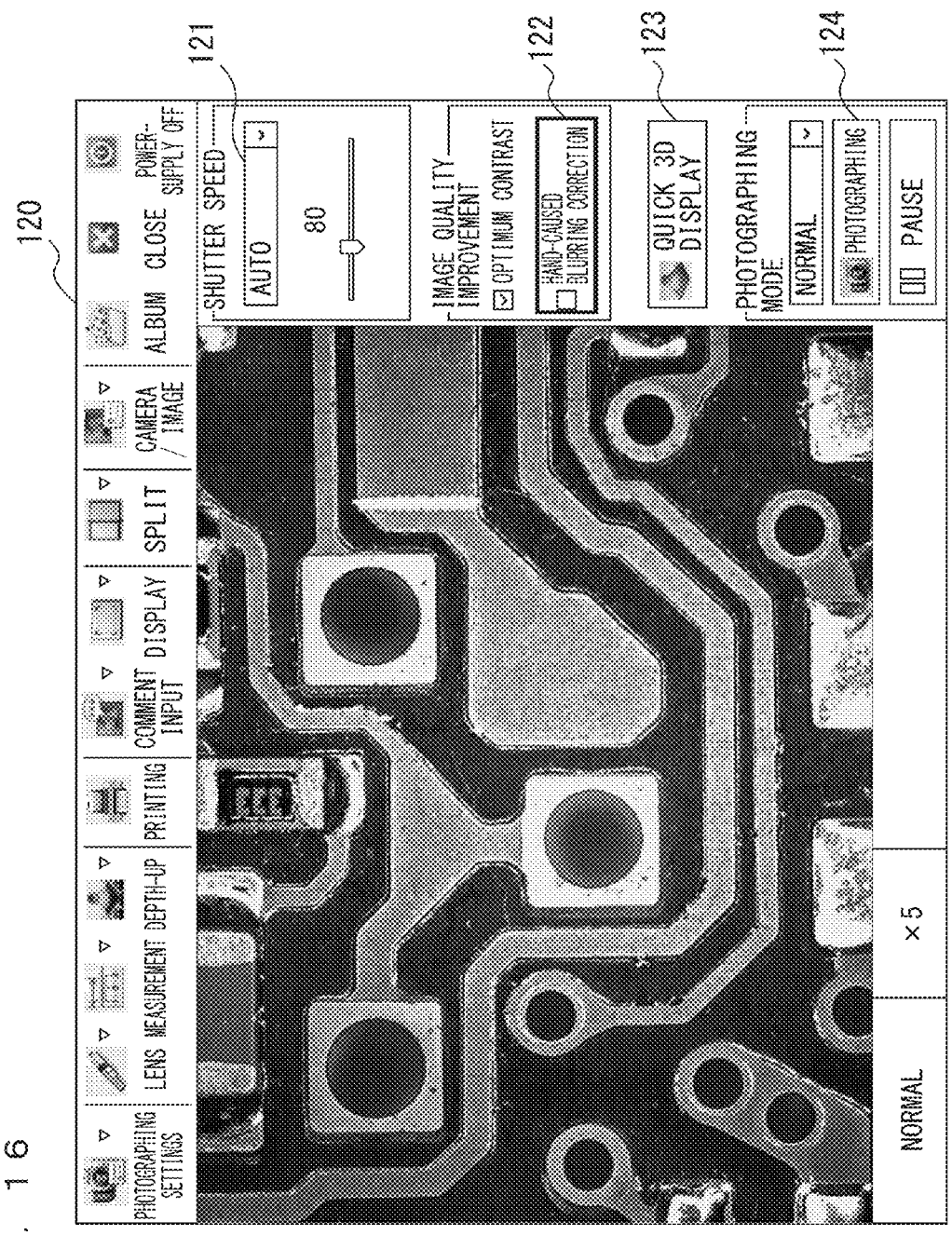
FIG. 16 is a view illustrating an example of an observation screen page 120 for magnification observations.
Figure 17:
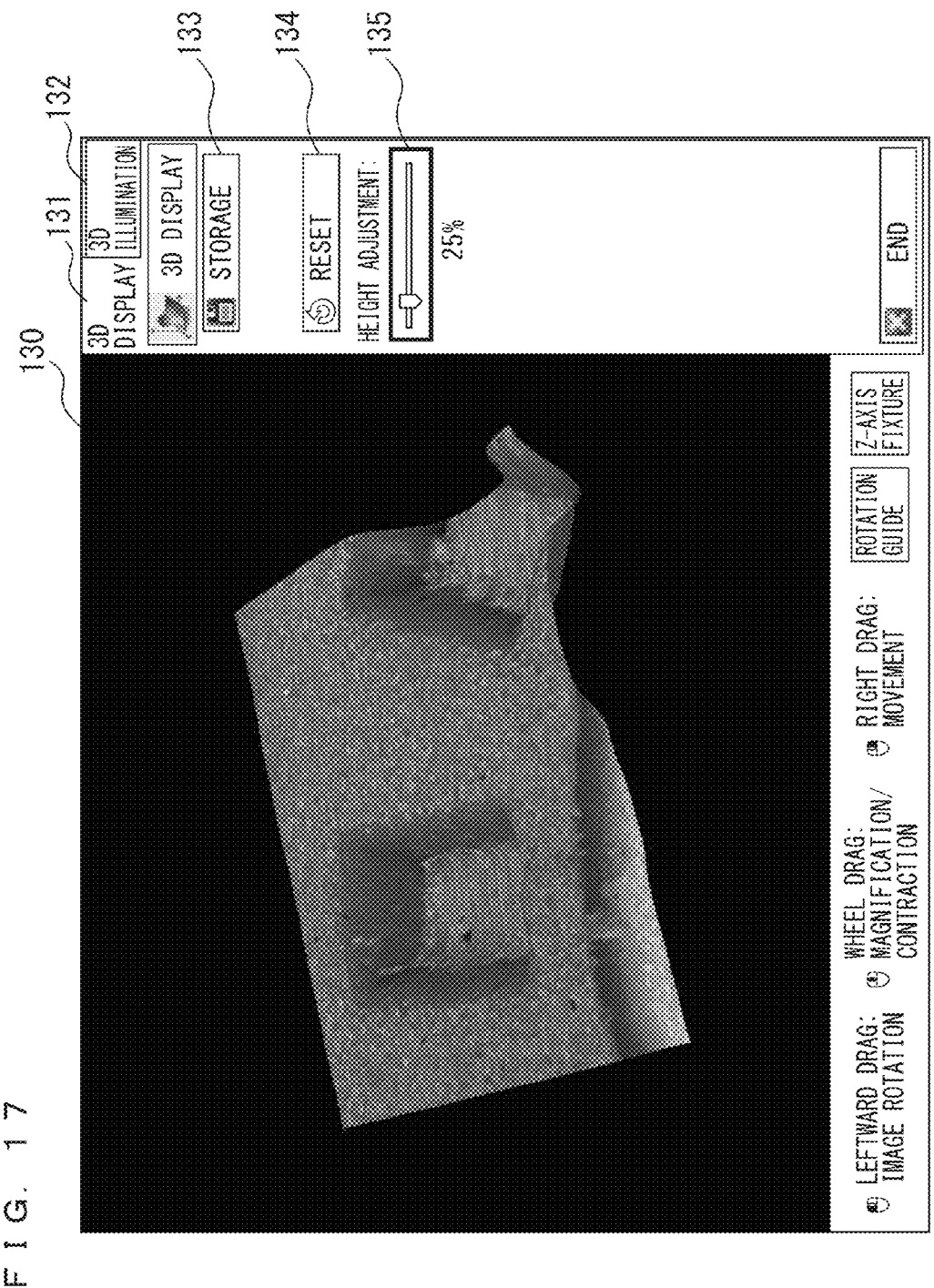
FIG. 17 is a view illustrating an example of a window screen page 130 for displaying the result of image processing.

With reference to FIG. 16 and FIG. 17, there will be described procedures for making settings for magnification observations. These figures illustrate operation screen pages, as other examples of user interface screen pages 300 of the image-pickup element operation program for operating the image pickup system 100. FIG. 16 illustrates an observation screen page 120 for magnification observations, and FIG. 17 illustrates a window screen page 130 for displaying the result of image processing.

The observation screen page 120 illustrated in FIG. 16 will be described. The observation screen page 120 is a screen page which is displayed on the display part 52 during magnification observations and is configured by an image display area, an operation area, and a tool bar. In this case, there is being displayed, as an object S, a board having wiring patterns formed thereon. In the operation area, there are placed a setting field 121 for setting the shutter speed, a setting field 122 for adjusting images, and operation buttons 123 and 124 for performing various types of operations.

The setting field 121 enables selecting "Auto" or "Manual" in a pull-down manner. If "Auto" is selected, the shutter speed is automatically adjusted to attain an image brightness which has been preliminarily set in the apparatus. More specifically, in FIG. 16, the value of "80" displayed at the portion of a slider bar indicates the image brightness. On the other hand, in cases where an operator desires a brightness different from the preset image brightness, the operator can move the slider bar leftwardly or rightwardly at the state where "Auto" has been selected, which changes the brightness of the image being displayed in the screen page along with the movement of the slider bar. This enables the operator to set desired image brightness. Namely, the operator is enabled to recognize the brightness corresponding to the position of the slider bar and to increase or decrease the shutter speed for adjusting the brightness.

On the other hand, if "Manual" is selected in the pull-down manner, the function of the slider bar displayed in FIG. 16 is changed from the function of indicating the image brightness for "Auto" to the function of concretely indicating the shutter speed or the exposure time and, above the bar, a value indicative of the shutter speed, such as $\frac{1}{1000}$ sec, is displayed. Namely, the operator is enabled to move the shutter bar leftwardly or rightwardly for increasing or decreasing the shutter speed, by making a reference to the value displayed above the shutter bar. The setting field 122 can select of processing, such as correction of blurring caused by hand movement.

The operation button 123 is an operation button for photographing an object S at constant time intervals and synthesizing created plural image frames for displaying the object S in a three-dimensional manner. More specifically, when the operation button 123 is operated, capture of images created by photographing is started. By manually moving the stage 230 in a single direction, it is possible to capture, into a nonvolatile memory, plural image frames corresponding to different heights in the direction of the optical axis (the Z direction). These image frames are synthesized to create a 3D image stereoscopically indicating convexity and concavity on the object surface, and the 3D image can be displayed in the window screen page 130.

The operation button 124 is an operation button for recording, as a static image, an image created by photographing which is being displayed.

The window screen page 130 illustrated in FIG. 17 will be described. The window screen page 130 is a screen page for use in displaying the result of processing on images created by photographing and is displayed on the display part 52 on the basis of operations on the operation button 123. In the window screen page 130, there are placed an image display area for displaying 3D images, and an operation area at the right of the image display area.

In the operation area, there are placed a "3D display" selection button 131, a "3D illumination" selection button 132, a "Storage" button 133, a reset button 134 and a height adjustment field 135. The "3D display" selection button 131 is an operation button for displaying, in the image display area, a 3D image created from plural image frames. The "3D illumination" selection button 132 is an operation button for displaying, in the image display area, a 3D image which has been subjected to image processing for virtually adjusting shadows therein. One of "3D display" or "3D illumination" can be selected.

The "Storage" button 133 is an operation button for storing a 3D image being displayed, in the nonvolatile memory. The reset button 134 is an operation button for resetting the display of images. Through the height adjustment field 135, it is possible to adjust the ratio of the height to a height base unit provided in the apparatus by operating the slide bar. For example, if noises are generated in the direction of the height of the displayed image, and the operator desires to suppress the noises, on the basis of the height base unit, the ratio of the height of the image to the base unit can be reduced for suppressing the displayed noises. Further, if the operator feels that information in the displayed image in the height direction is contracted on the basis of the height base unit, the ratio of the height of the image to the base unit can be increased for magnifying and emphasizing the information in the height direction.

As described above, with the image pickup system 100 which is the premise of the image processing apparatus according to the first embodiment of the present invention, it is possible to add the high-speed photographing function to a conventional magnification observation apparatus to enhance its general versatility as an image pickup element. For example, it is possible to utilize the image pickup element for applications for searching for causes of abnormalities, thereby enhancing the convenience thereof. Further, the functions of the image pickup element can be utilized without preparing a camera and illuminations for high-speed photographing which have been conventionally required to be prepared additionally. This enables high-speed photographing with lower costs and also facilitates maintenance of the image pickup element, thereby realizing large cost reduction and an image pickup element with high efficiency.

Hereinafter, there will be described the image processing apparatus according to the first embodiment of the present invention. The image processing apparatus is adapted to be an image pickup element capable of changing over the operation mode between a magnification observation mode for observing an object S by magnifying it and a high-speed photographing mode for photographing movement of an object S at a high speed.

(The Functional Structure of the Main Body Part 50)

Figure 18:
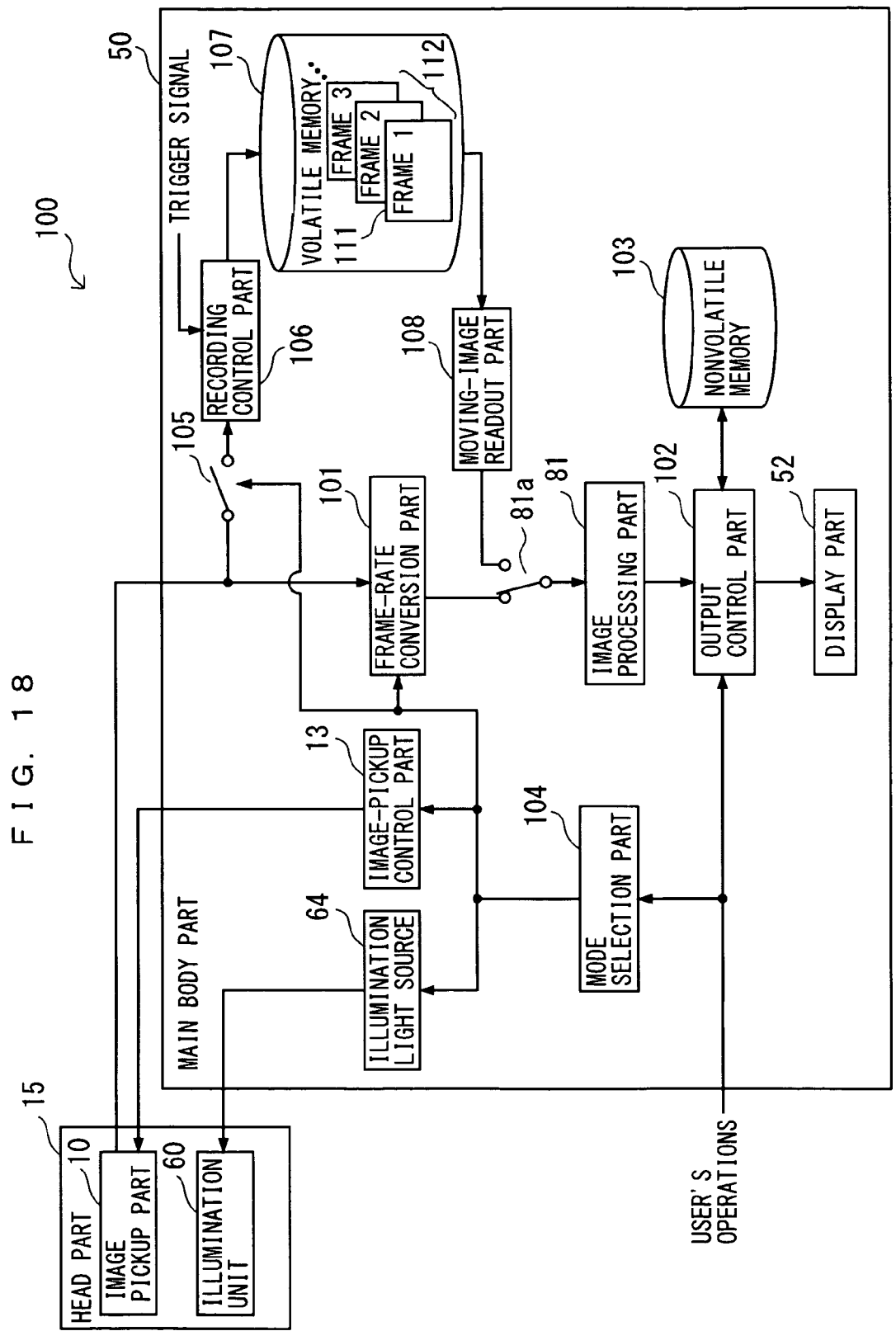
FIG. 18 is a block diagram illustrating an exemplary configuration of main parts of the image pickup system 100 in FIG. 1, illustrating an exemplary functional configuration of the main body part 50.

FIG. 18 is a block diagram illustrating an exemplary configuration of main parts of the image pickup system 100 in FIG. 1, illustrating an example of the functional structure within the main body part 50. The main body part 50 is configured to include a frame-rate conversion part 101, an output control part 102, a nonvolatile memory 103, a mode selection part 104, a switch 105, a recording control part 106, a volatile memory 107, a moving-image readout part 108 and a changeover part 81a in addition to the image-pickup control part 13, the display part 52, the illumination light source 64 and the image processing part 81.

The illumination light source 64 is a light source device which controls lighting on the basis of commands from the mode selection part 104 and creates illumination light according to the operation mode.

The image-pickup control part 13 performs operations for controlling the image pickup part 10 on the basis of commands from the mode selection part 104. For example, the image-pickup control part 13 performs operations for creating control signals for specifying photographing parameters such as the exposure time and the frame rate (the exposure interval) and, then, supplying them to the image pickup part 10. In this case, the exposure time relates to the shutter speed, and the exposure time decreases with increasing shutter speed. Further, the frame rate can be also referred to as an exposure interval, and the exposure repetition interval decreases with increasing frame rate. More specifically, the mode selection part 104 which changes over between the "Magnification Observation mode" and the "High-Speed Photographing" is adapted such that, at the time of the mode changeover (selection), a graphical user interface corresponding to the selected mode, which is not illustrated, is displayed in the screen page, which enables making settings of the exposure time and the frame rate, as initial settings, through the interface. Further, the set values of the exposure time and the frame rate set through the interface are transferred to the image pickup part 10 through the image-pickup part 13. Further, in this case, the user interface is controlled by a mode setting part which is not illustrated.

Although not illustrated, the image pickup part 10 includes a digital circuit for storing the transferred exposure time and frame rate, which is structured inside thereof. Accordingly, unless the content of the storage is changed, the image pickup part 10 performs image pickup on the basis of the stored set values and continuously transfers the images created by image pickup to the main body part 50.

In the present example, the image pickup part 10 is configured to store the aforementioned set values in the digital circuit inside thereof and, therefore, these set values can be transmitted to the image pickup part 10 at the time of the mode setting. However, as a matter of cause, when the image pickup part 10 includes no storage device as described above, it is possible to employ a method which transmits, from the image-pickup control part 13, photographing timing signals indicative of the start and end of exposure and the exposure interval (the frame rate) and the like, at every image-pickup timing.

Further, no matter which of the modes has been selected, the mode selection part 104 recognizes the selected mode and transmits, to the image pickup part 10, the aforementioned set values as default values for the respective modes which are stored in the operation control part, which is not illustrated. Further, in the "Magnification Observation mode", there is no need for changing these set values after the selection of the mode. However, in the "High-Speed Photographing mode", changing of the set values is enabled through the user interface in order to enable the operator to change these set values to desired values within a high-frame-rate range.

The frame-rate conversion part 101 performs processing for decreasing the frame rate, in order to display, on the display part 52, image data transferred from the image pickup part 10. For example, the frame rate can be decreased through thin-out processing for thinning out the image frames at constant time intervals.

In the present example, in any of the modes, the frame-rate conversion part 101 performs processing for decreasing the frame rate of images transferred from the image pickup part 10 to a predetermined frame rate in order to display the images on the display part 52. However, in the "Magnification Observation mode", the frame rate of images transferred from the image pickup part 10 has been already set to be a video rate (a frame rate which can visually recognize changeover among images when the display part successively changes over among images) which is equal to or less than 60 fps, for example, and, therefore, the frame-rate conversion part 101 is less required to change the frame rate. Accordingly it is possible to transfer images transferred from the image pickup part 10 to the display part 52 through the frame-rate conversion part 101, only in the "High-Speed Photographing mode".

The image processing part 81 performs, on RAW data created by photographing by the image pickup part 10, image processing such as gamma correction processing, processing for adjusting the white balance of images created by photographing, and the like, to create display data to be displayed on the display part 52. In this case, image data which has been subjected to the frame-rate conversion by the frame-rate conversion part 101 and image data read out from the volatile memory 107 by the moving-image readout part 108 are selectively subjected to the processing.

More specifically, in the "Magnification Observation mode" and the "High-Speed Photographing mode", in any cases, the image processing part 81 is kept connected to the frame-rate conversion part 101. On the other hand, in the "High-Speed Photographing mode", only in cases of performing "photographing" and "recording" at a set high frame rate for images created through high-speed image pickup, the switch 105 is brought into a connection state, so that images from the image pickup part 10 are accumulated in the volatile memory 107 at the set frame rate. As a matter of cause, in this case, similarly, the image processing part 81 is kept connected to the frame-rate conversion part 101. Further, in the "high-speed photographing mode", similarly, when there is no need for storing images in the volatile memory 107 at a high frame rate, such as when images are merely displayed on the display part 52, the switch 105 is maintained at a non-connection state, and the image processing part 81 is kept connected to the frame-rate conversion part 101. The operation control part, which is not illustrated, performs control of the operations of the switch 105, the volatile memory 107 and the operation reading part 108, by recognizing the contents of operations performed through the user interface.

The gamma correction processing and the white-balance adjustment processing are both luminance-level adjustment processing for adjusting the luminance level of each pixel on the basis of predetermined conversion tables. Further, in cases of color images, processing for performing Bayer's transformation on image data is performed as the aforementioned image processing. Bayer's transformation is determining for respective plural light receiving elements, R, G and B luminance information for each pixel by calculating other color information (luminance information) for interpolation.

The output control part 102 performs operations for outputting display data from the image processing part 81 to the display part 52 and for writing it in the nonvolatile memory 103 as required. The nonvolatile memory 103 is a recording medium for holding the image data subjected to the processing by the image processing part 81 and is constituted by, for example, a magnetic storage device such as an HDD (hard disk drive) or a semiconductor storage device such as a flash memory.

The mode selection part 104 controls the illumination light source 64, the image-pickup control part 13, the frame-rate conversion part 101 and the switch 105 for performing processing for changing over the operation mode between the magnification observation mode and the high-speed photographing mode.

The magnification observation mode is an operation mode in which magnified images of the object S are processed, and images with a higher resolution than that in the high-speed photographing mode are created. Static images or moving images written in the nonvolatile memory 103 in the magnification observation mode are optionally read out therefrom, to perform analysis processing, such as measurements of dimensions of the object S and depth synthesis.

On the other hand, the high-speed photographing mode is an operation mode in which movement of the object S is photographed at a high speed, and images are created at a higher frame rate than in the magnification observation mode. While, in the magnification observation mode, image data from the image pickup part 10 is transferred to the frame-rate conversion part 101, in the high-speed photographing mode, if an operation for storing image data in the volatile memory 107 while maintaining its frame rate at a high frame rate such as a frame rate for "recording" is performed, the switch 105 is turned on for transferring the image data to the frame-rate conversion part 101 and the recording control part 106. Needless to say, if no operation for storing image data in the volatile memory 107 while maintaining its frame rate at a high frame rate such as a frame rate for "recording" is performed, the image data is merely displayed on the display part 52, after its frame rate is decreased to a predetermined value by the frame-rate conversion part 101.

In the magnification observation mode, image data having a frame rate lower than the video rate is transferred from the image pickup part 10 to the frame-rate conversion part 101. For example, image data having a frame rate in the range of 15 fps to 60 fps is transferred. At this time, the frame-rate conversion part 101 performs operations for changing the frame rate to, for example, 15 fps and outputting the image data to the image processing part 81. In this case, the video rate refers to the value of a highest frame rate which enables viewing changeover among images. Further, as described above, in the magnification observation mode, the frame rate of image data transferred from the image pickup part 10 has been already set to a value equal to or less than the video rate and, therefore, it is not necessarily necessary to transfer images created by image pickup by the image pickup part 10 to the display part 52 through the frame-rate conversion part 101, and the images can be directly supplied to the display part 52.

On the other hand, in the high-speed photographing mode, image data having a frame rate higher than the video rate, such as a frame rate in the range of, for example, 250 fps to 24000 fps, is transferred from the image pickup part 10 to the frame-rate conversion part 101 or the recording control part 106. At this time, the frame-rate conversion part 101 performs operations for changing the frame rate to the same frame rate as that in the magnification observation mode, such as 15 fps, and outputting the image data to the image processing part 81.

The image-pickup control part 13 performs control for making the exposure repetition intervals (the frame rates) in the magnification observation mode and in the high-speed photographing mode to be different from each other in order to make the frame rates during magnification observations and during high-speed photographing to be different from each other. The mode selection part 104 performs mode selections on the basis of user's operations. For example, if the magnification observation mode or the high-speed photographing mode is selected through the menu screen page, then the operation mode will be changed over. In any of the operation modes, image data which has been subjected to the frame-rate conversion is subjected to image processing and, then, the image data subjected to the image processing is outputted to the display part 52, which enables checking, in real time, the state of the object S through the display part 52.

The recording control part 106 performs an operation for writing, in the volatile memory 107, image data transferred thereto from the image pickup part 10. The volatile memory 107 is a memory for temporarily holding the image data created by photographing by the image pickup part 10 and serves as a storage device capable of operating at a higher speed than the nonvolatile memory 103.

In this case, if an operation for recording or the like is performed in the high-speed photographing mode, RAW data from the image pickup part 10, namely luminance data which has not been subjected to image processing, is written chronologically in the volatile memory 107 and is held therein as a series of image frames, namely a moving image 112 constituted by continuous plural image frames 111. For example, writing of such a moving image can be performed, on the basis of a trigger signal for generating a command for start of recording.

As an exemplary trigger signal for starting recording, writing of images in the volatile memory 107 can be started, if an operation corresponding to preparations for recording is recognized or if an operation for recording is recognized.

Further, regarding the end of recording, since the volatile memory 107 is of a ring buffer type, if there have been already data written therein at the time of start of recording, the operator is urged to select, through the interface, writing into the entire area of the memory or writing into an area into which no data has been written. If writing into the entire area of the memory is selected, the writing can be automatically ended, at the time when writing into the entire memory area has been completed. On the other hand, if writing into an area in which no data has been written is selected, the writing can be automatically ended, at the time when the writing into the area has been completed. Also, it is possible to cause the operator to set, through the interface, the time available for writing into the memory and the number of images which can be written in the memory, within the limits based on the actual capacity of the memory. In this case, similarly, it is preferable that recording is automatically ended, at the time when the set writing time and the set number of images have been reached, after the start of writing.

The moving-image readout part 108 performs operations for reading out image data from the volatile memory 107 and transferring it to the image processing part 81 at a frame rate lower than that for writing by the recording control part 106. Accordingly, moving images written in the volatile memory 107 are transferred, at a frame rate lower than that for writing, to the image processing part 81 and then are processed thereby and, then, the processed moving images are stored in the nonvolatile memory 103. When a moving image in the nonvolatile memory 107 which has been written during high-speed photographing is read out therefrom and is transferred to the image processing part 81, the moving image is transferred thereto at a frame rate lower than that for writing, which enables utilizing the common image processing part 81 for both magnification observations and high-speed photographing.

The action for operating the moving-image readout part 108 for transferring images from the volatile memory 107 to the image processing part 81 can be performed, as follows. That is, it is possible to provide the function of enabling manually or automatically previewing recorded moving images after the completion of the aforementioned "recording" action, in such a way as to cause the moving-image readout part 108 to operate on receiving a recording completion signal or in such a way as to activate a switch which asks the operator whether or not he or she desires to perform preview through the user interface after the operation control part which is not illustrated recognizes the completion of recording and, if the operator desires it, cause the moving-image readout part 108 to operate. Further, as other actions, the moving-image readout part 108 can be operated, if the operator operates a button in the user interface for replaying an image written in the volatile memory 107 or if the operator operates a button in the user interface for storing, in the nonvolatile memory 103, an image written in the volatile memory 107.

Further, in cases where the aforementioned recording control part 106 is operated, the operation control part performs control, such that the switch (the changeover part 81a) for connecting the frame-rate conversion part 101 and the image processing part 81 to each other is changed over to connect the recording control part 106 and the image processing part 81 to each other. In other words, the switch for changing over the connection destination of the image processing part 81 between the frame-rate conversion part 101 and the moving-image readout part 108 usually connects the image processing part 81 to the frame-rate conversion part 101 and, if the operation control part recognizes that the aforementioned moving-image readout action in the high-speed photographing mode has been automatically or manually performed, the switch is caused to connect the image processing part 81 to the moving-image readout part 108. Further, the moving-image readout part 108 is caused to have the function of supplying moving images to the image processing part 81 at a frame rate lower than the frame rate for writing, in reading moving images from the volatile memory 107, which offers the advantage of elimination of the necessity of enhancing the function of the image processing part 81 to address high-speed processing. However, when the image processing part 81 has performance capable of performing processing at the same frame rate as the frame rate for writing into the volatile memory 107, there is no need for causing the moving-image readout part 108 to have the function of changing the frame rate.

The output control part 102 performs operations for writing, into the nonvolatile memory 103, display data created from image data written in the volatile memory 107 by the recording control part 106 in the high-speed photographing mode, as static images or moving images constituted by series of image frames. Writing of static images or moving images is performed on the basis of, for example, user's operations. Also, the output control part 102 can be configured to automatically read a moving image from the volatile memory 107 and write it into the nonvolatile memory 103, if "Auto Replay" is preliminarily specified. Also, when static images or a moving image are stored in the nonvolatile memory 103, it is possible to perform compression processing thereon for compressing the amount of data, such that the image data subjected to the compression processing are written therein.

Such moving images or static images which have been read from the volatile memory 107, then processed by the image processing part 81 and then written in the nonvolatile memory 103 can be read out therefrom, as required, and, then, can be displayed as such or after being subjected to luminance-level adjustments, again.

Further, the output control part 102 performs an operation for writing, in the nonvolatile memory 103, display data created by photographing in the magnification observation mode, as static images. The writing of such static images is performed on the basis of user's operations.

(The Magnification Observation Mode)

Figure 19:
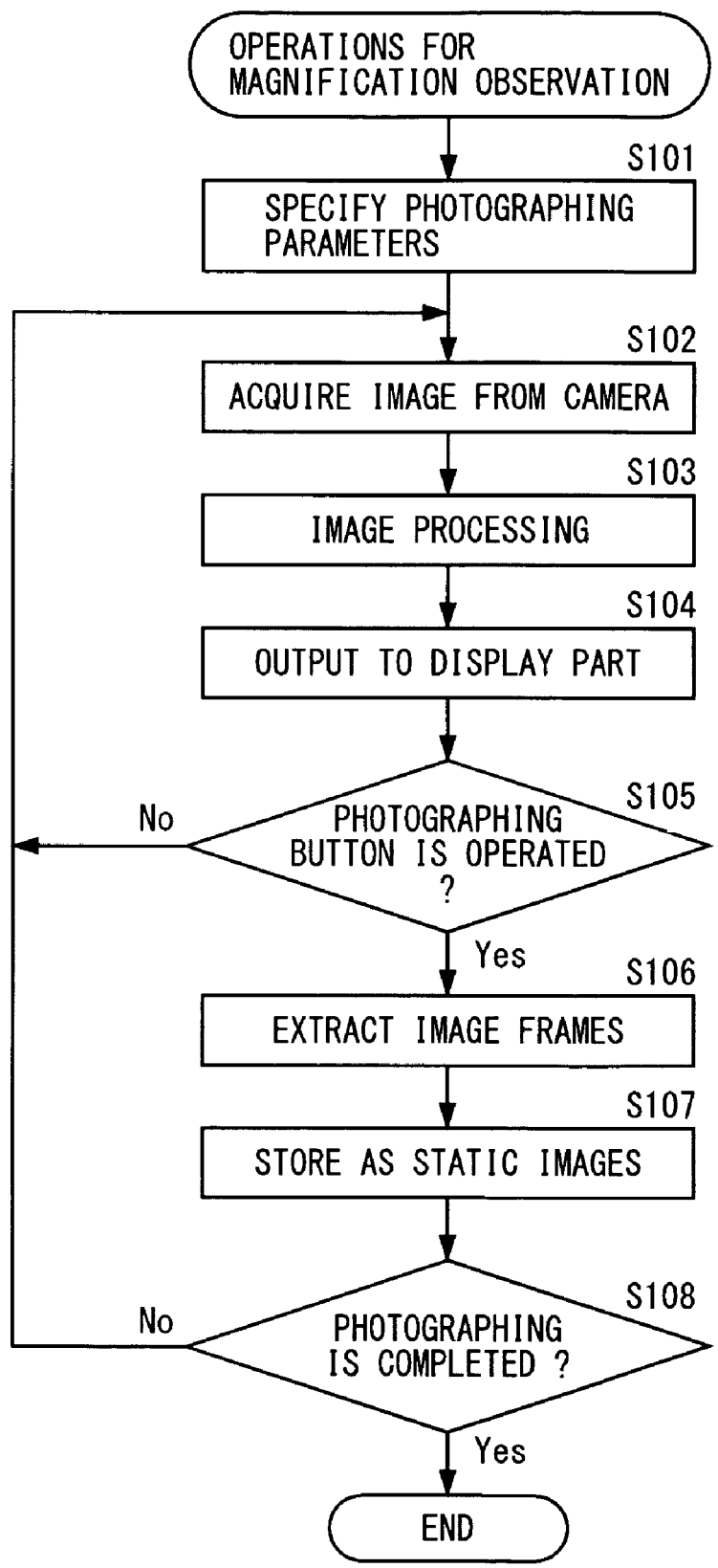
FIG. 19 is a flow chart illustrating exemplary operations for magnification observations in the main body part 50 in FIG. 18.

In FIG. 19, steps S101 to S108 illustrate a flow chart illustrating exemplary operations during a magnification observation in the main body part 50 in FIG. 18. At first, the image-pickup control part 13 provides, to the image pickup part 10, specifications of photographing parameters, such as the exposure time (step S101). Next, the frame-rate conversion part 101 acquires image data from the image pickup part 10 and outputs it to the image processing part 81 at a reduced frame rate (step S102).

The image processing part 81 performs image processing for adjusting the luminance levels on the image data from the frame-rate conversion part 101 to create display data (step S103). The output control part 102 outputs this display data to the display part 52 which displays it on its screen (step S104).

At this time, if the operation button 124 is operated (step S105), on the basis of the inputted operation, predetermined image frames are extracted from the display data created before and after the operation and are stored as static images in the nonvolatile memory 103 (steps S106 and S107). The processing procedures in steps S102 to S107 are repeated until the end of photographing (step S108).

On the other hand, if the operation button 124 is not operated in step S105, the processing procedures in steps S102 to S104 are repeated.

(The High-Speed Photographing Mode)

Figure 20:
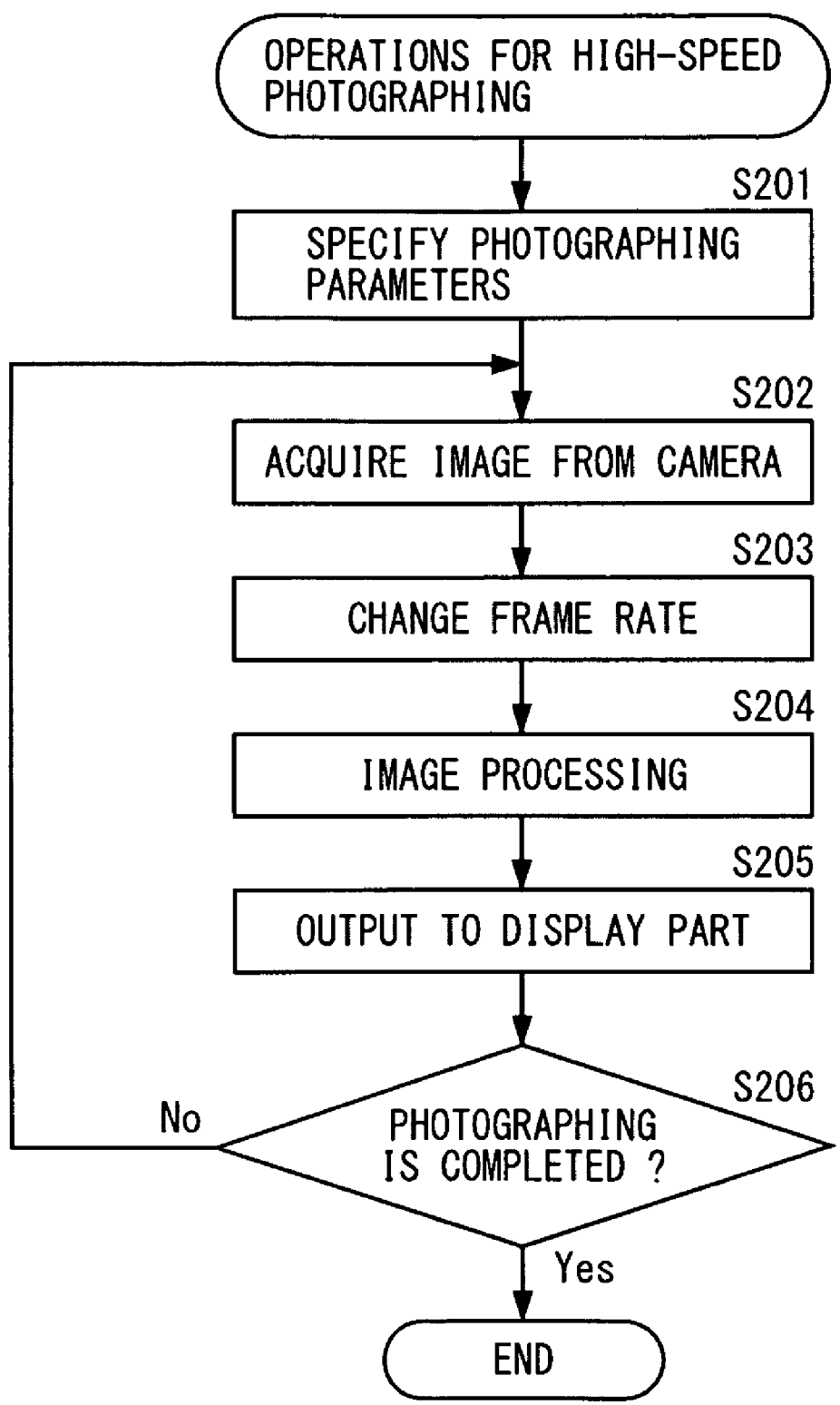
FIG. 20 is a flow chart illustrating exemplary operations for high-speed photographing in the main body part 50 in FIG. 18.

Steps S201 to S206 in FIG. 20 illustrate a flow chart illustrating exemplary operations during a high-speed photographing in the main body part 50 in FIG. 18. At first, the image-pickup control part 13 provides, to the image pickup part 10, specifications of photographing parameters, such as the exposure time (step S201). Next, the frame-rate conversion part 101 acquires image data from the image pickup part 10 and outputs it to the image processing part 81 at a reduced frame rate (steps S202 and S203).

The image processing part 81 performs image processing for adjusting the luminance levels on the image data from the frame-rate conversion part 101 to create display data (step S204). The output control part 102 outputs this display data to the display part 52 which displays it on its screen (step S205). The processing procedures in steps S202 to S205 are repeated until the end of photographing (step S206).

Figure 21:
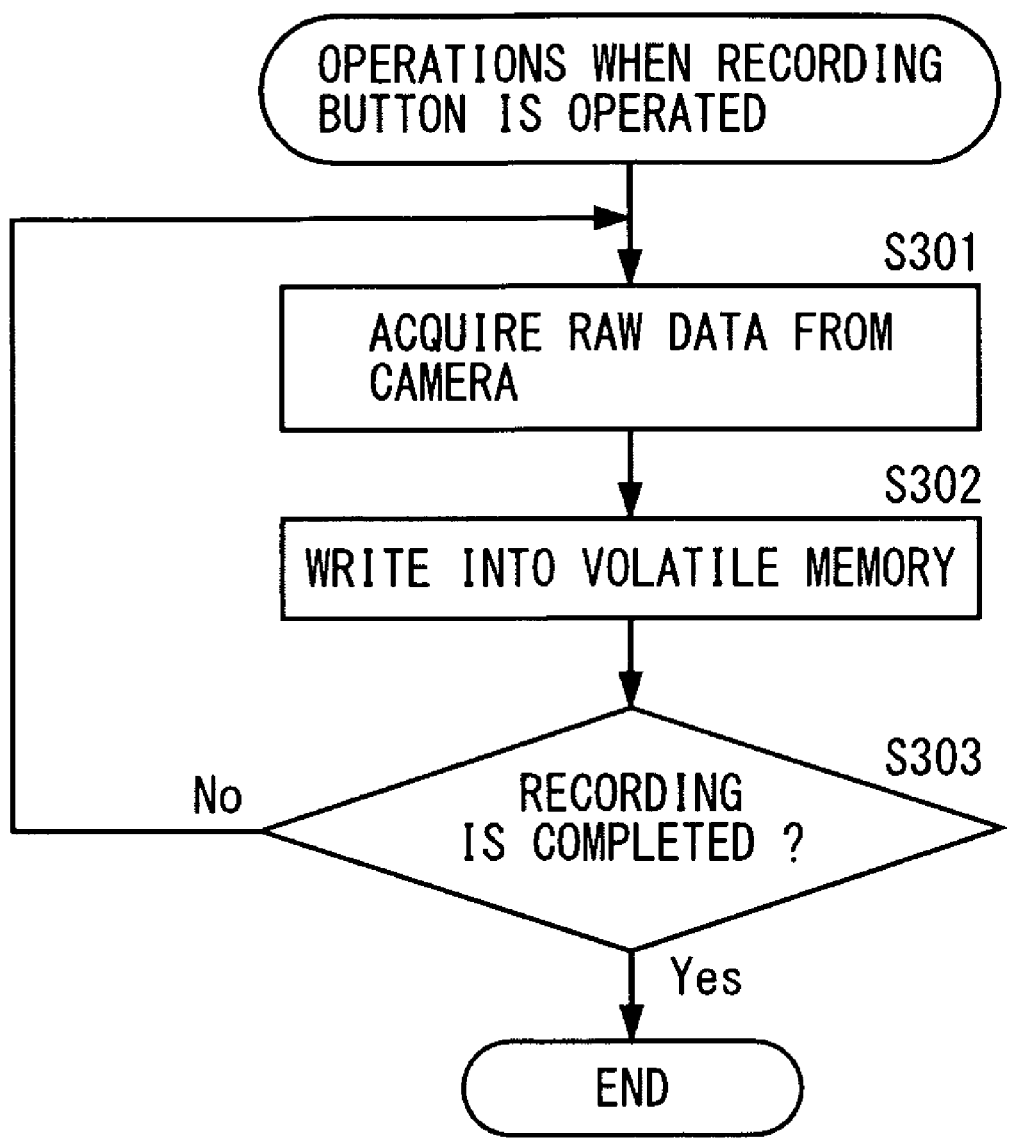
FIG. 21 is a flow chart illustrating exemplary operations when a recording button is operated in the main body part 50 in FIG. 18.

Steps S301 to S303 in FIG. 21 illustrate a flow chart illustrating exemplary operations during an operation of the recording button in the main body part 50 in FIG. 18. At first, if the recording control part 106 receives a command for start of recording due to an operation on the recording button 318 during display of images created by photographing, the recording control part 106 acquires RAW data from the image pickup part 10 and writes it in the volatile memory 107 (steps S301 and S302). The processing procedure in step S207 is repeated, until the end of recording (step S303).

Figure 22:
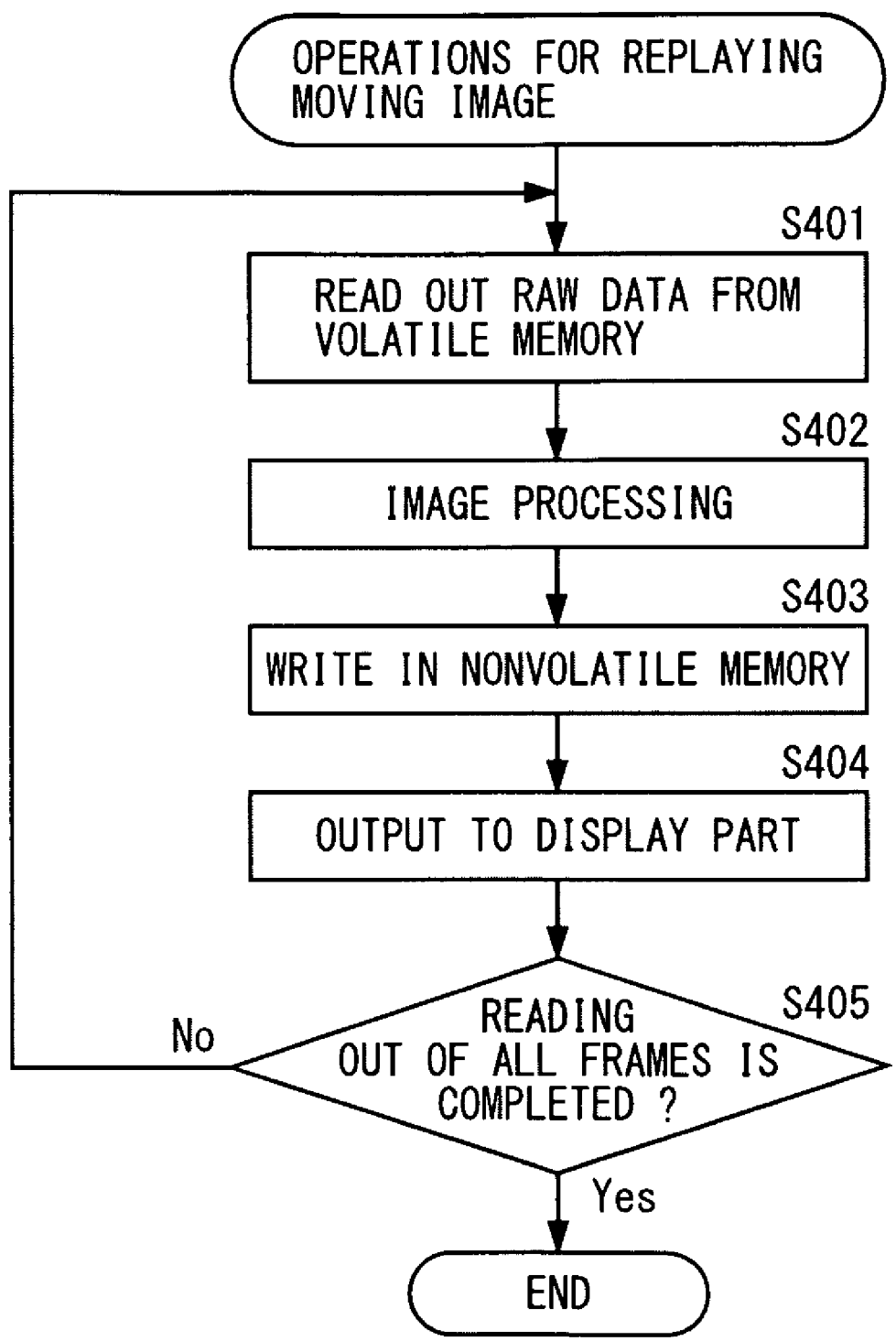
FIG. 22 is a flow chart illustrating exemplary operations for replaying a moving image in the main body part 50 in FIG. 18.

Steps S401 to S405 in FIG. 22 illustrate a flow chart illustrating exemplary operations during replay of a moving image in the main body part 50 in FIG. 18. At first, if the moving-image readout part 108 receives a command for replay of a moving image due to user's operations, the moving-image readout part 18 reads out RAW data from the volatile memory 107 and transfers it to the image processing part 81 (step S401). The image processing part 81 performs processing on the RAW data transferred from the volatile memory 107 to create display data (step S402).

The output control part 102 writes the display data in the nonvolatile memory 103 and outputs it to the display part 52 (steps S403 and S404). The processing procedures in steps S401 to S404 are repeated, until the completion of readout of all the frames of the moving image stored in the volatile memory 107 (step S405).

In the present embodiment, the common image processing part 81 can be used for both magnification observations and readout of moving images written in the volatile memory 107 in the high-speed photographing mode, which can realize an image processing apparatus capable of changing over the operation mode between the magnification observation mode and the high-speed photographing mode without increasing the fabrication cost.

Second Embodiment

In the first embodiment, there has been described a case where the operation mode is changed over on the basis of user's operations. On the other hand, in the present embodiment, there will be described a case where the operation mode is changed over on the basis of the result of identification of the camera.

Figure 23:
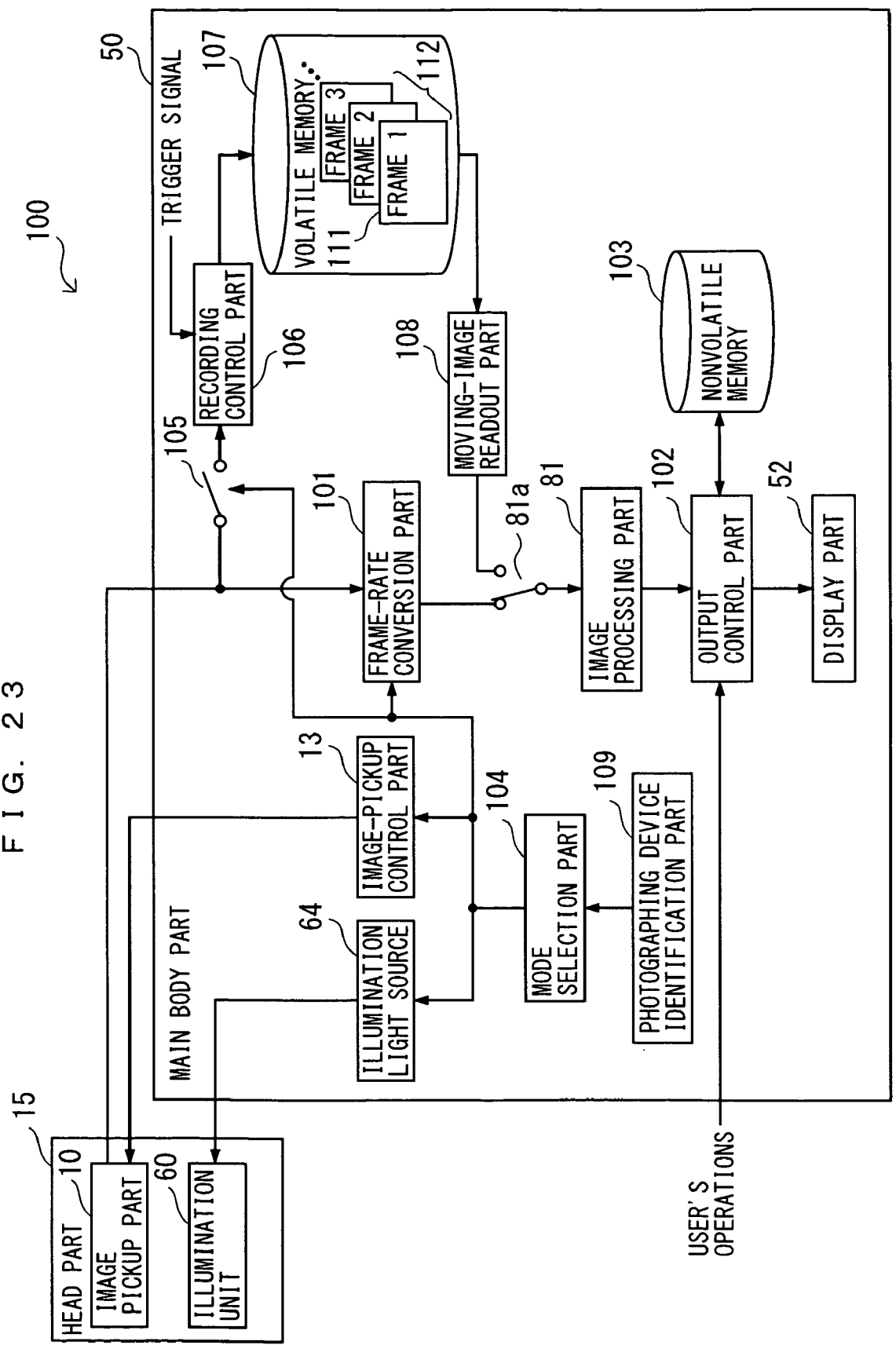
FIG. 23 is a block diagram illustrating an exemplary configuration of an image processing apparatus according to a second embodiment of the present invention.
Figure 24:
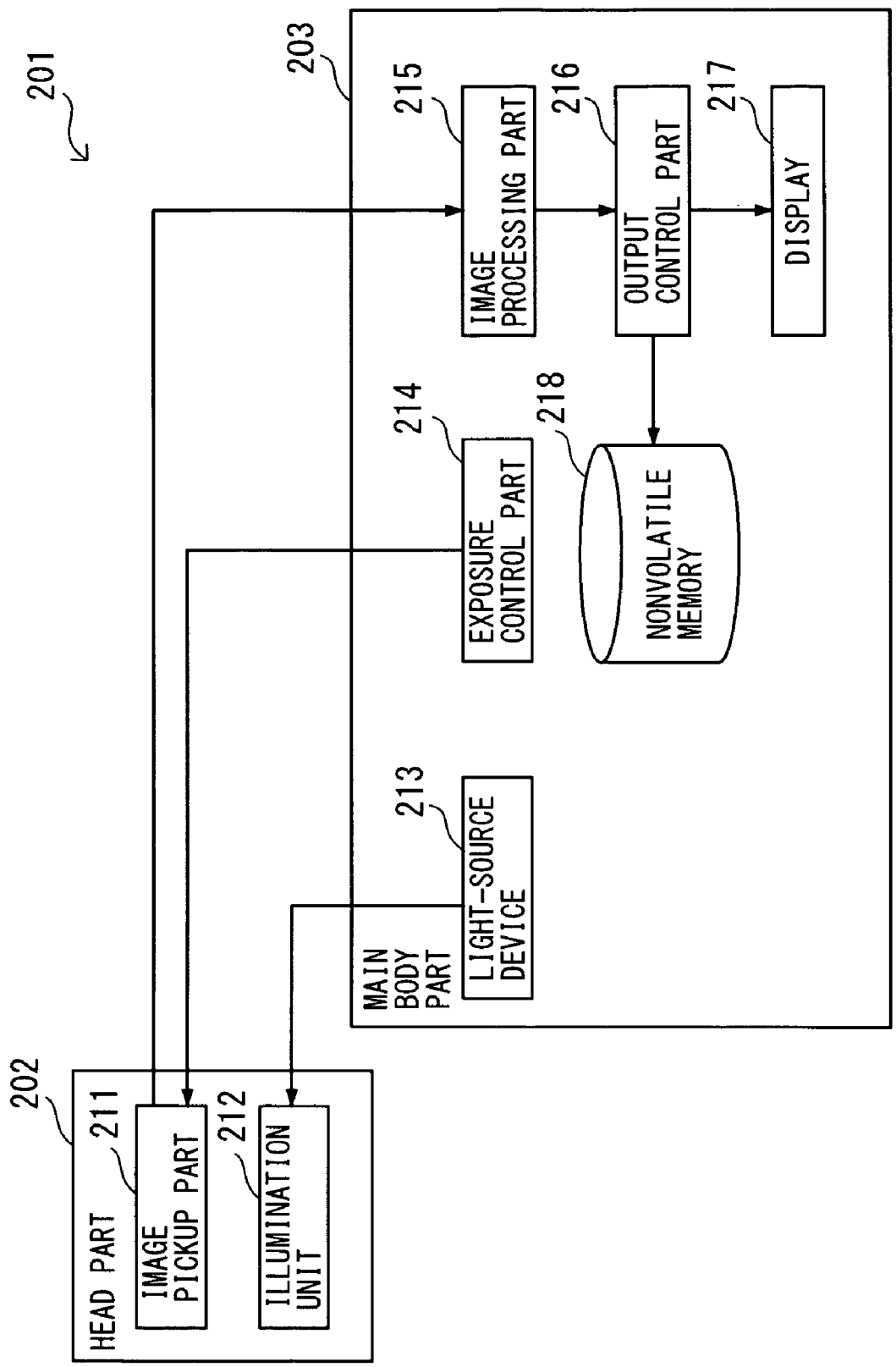
FIG. 24 is a block diagram illustrating a conventional magnification observation apparatus.

FIG. 23 is a block diagram illustrating an exemplary configuration of an image processing apparatus according to a second embodiment of the present invention. The image processing apparatus according to the present embodiment is different in that it includes a photographing-device identification part 109, in comparison with the main body part 50 in FIG. 18. The photographing-device identification part 109 performs an operation for identifying whether the camera connected to the main body part 50 is intended for magnification observations or for high-speed photographing.

For example, the photographing-device identification part 109 detects the presence or absence of an illumination attachment, the types of lenses, the type of the image pickup module 16, the connection destination of the cable part 24 and the types of lamps to determine whether the camera is intended for magnification observations or for high-speed photographing. The mode selection part 104 performs processing for changing over the operation mode between the magnification observation mode and the high-speed photographing mode, on the basis of the result of the aforementioned identification by the photographing-device identification part 109.

In cases where the photographing-device identification part 109 detects the type of the image pickup module 16, the photographing-device identification part 109 can possibly detect whether the image pickup module 16 is intended for monochrome or color images or detects whether it is intended for high frame rates or low frame rates. Further, in cases where the photographing-device identification part 109 detects the types of lamps, the photographing-device identification part 109 can possibly detect whether the illumination light source 64 is of a high color-rendering type or of a high-luminance type.

What is claimed is:

1. An image processing apparatus which performs image processing on images created by image pickup at a first image frame rate which can visually recognize images and, also, performs image processing on images created by image pickup at a second image frame rate higher than the first frame rate, the image processing apparatus comprising:
    a mode selection unit which selects one of a magnification observation mode for observing an object at the first frame rate by magnifying it and a high-speed photographing mode for photographing a moving object at a high speed at the second frame rate;
    an image pickup unit which is capable of capturing images at the first and second frame rates and performs image pickup on an object at the first or second frame rate selected by the mode selection unit;
a frame-rate conversion unit which performs processing for decreasing the frame rate of image data of an object, the image data of the object created by image pickup at the first or second frame rate corresponding to the mode selected by the mode selection unit being transferred to the frame-rate conversion unit, by the image pickup unit;
a first memory into which image data at the second frame rate from the image pickup unit is written during recording operations in the high-speed photographing mode;
a moving-image readout unit which reads out image data from the first memory during readout of image data from the first memory in the high-speed photographing mode;
an image processing unit which performs processing for adjusting luminance levels on image data subjected to the frame-rate conversion by the frame-rate conversion unit to create display data and, also, performs processing for adjusting luminance levels on image data read out from the first memory by the moving-image readout unit;
a changeover unit which connects one of the frame-rate conversion unit and the moving-image readout unit to the image processing unit and, also, connects the moving-image readout unit to the image processing unit only when image data is read out from the first memory by the moving-image readout unit;
a display unit which displays display data created by the image processing unit; and
a second memory which stores respective images when image data displayed on the display unit is stored and when image data in the first memory is stored in the magnification observation mode.

2. An image processing apparatus which performs image processing on images created by image pickup at a first image frame rate which can visually recognize the images and, also, performs image processing on images created by image pickup at a second image frame rate higher than the first frame rate, the image processing apparatus comprising:
a mode selection unit which selects one of a magnification observation mode for observing an object at the first frame rate by magnifying it and a high-speed photographing mode for photographing a moving object at a high speed at the second frame rate;
an image pickup unit which is capable of capturing images at the first and second frame rates and performs image pickup on an object at the first or second frame rate which has been selected by the mode selection unit;
a frame-rate conversion unit which performs processing for decreasing the frame rate of image data of an object, the image data of the object created by image pickup at the second frame rate corresponding to the high-photographing mode selected by the mode selection unit being transferred to the frame-rate conversion unit, by the image pickup unit;
a first memory into which image data at the second frame rate from the image pickup unit is written during recording operations in the high-speed photographing mode;
a moving-image readout unit which reads out image data from the first memory during readout of image data from the first memory in the high-speed photographing mode;
an image processing unit which performs processing for adjusting luminance levels on image data having the first frame rate created by image pickup in the magnification observation mode and on image data subjected to the frame-rate conversion by the frame-rate conversion unit to create display data and, also, performs processing for adjusting luminance levels on image data read out from the first memory by the moving-image readout unit;
a changeover unit which connects one of the frame-rate conversion unit and the moving-image readout unit to the image processing unit and, also, connects the moving-image readout unit to the image processing unit only when image data is read out from the first memory by the moving-image readout unit;
a display unit which displays display data created by the image processing unit; and
a second memory which stores respective images when image data displayed on the display unit is stored and image data in the first memory is stored in the magnification observation mode.

3. The image processing apparatus according to claim 1, further comprising an image-pickup control unit which creates exposure timing signals for specifying exposure timings and supplies them to the image pickup unit,
wherein the image pickup control unit makes the exposure repetition intervals in the magnification observation mode and in the high-speed photographing mode to be different from each other in order to make the frame rates during the magnification observations and during the high-speed photographing to be different from each other.

4. The image processing apparatus according to claim 1, further comprising a photographing-device identification unit which identifies the image pickup unit,
wherein the mode selection unit selects the mode on the basis of the result of the identification by the photographing-device identification unit.

5. The image processing apparatus according to claim 2, further comprising an image-pickup control unit which creates exposure timing signals for specifying exposure timings and supplies them to the image pickup unit,
wherein the image pickup control unit makes the exposure repetition intervals in the magnification observation mode and in the high-speed photographing mode to be different from each other in order to make the frame rates during the magnification observations and during the high-speed photographing to be different from each other.

6. The image processing apparatus according to claim 2, further comprising a photographing-device identification unit which identifies the image pickup unit,
wherein the mode selection unit selects the mode on the basis of the result of the identification by the photographing-device identification unit.

* * * * *